US012482961B2

(12) United States Patent
Yang et al.

(10) Patent No.: US 12,482,961 B2
(45) Date of Patent: Nov. 25, 2025

(54) CABLE CONNECTOR

(71) Applicant: Amphenol AssembleTech(Xiamen) Co., Ltd., Xiamen (CN)

(72) Inventors: Wenchu Yang, Xiamen (CN); Hui Tang, Xiamen (CN); Xiaodong Wang, Xiamen (CN); Tao Lyu, Xiamen (CN); Zhenxing Liu, Xiamen (CN); Haitao Xiong, Xiamen (CN); Hang Li, Xiamen (CN); Shaokui Feng, Xiamen (CN)

(73) Assignee: Amphenol AssembleTech(Xiamen) Co., Ltd., Xiamen (CN)

( * ) Notice: Subject to any disclaimer, the term of this patent is extended or adjusted under 35 U.S.C. 154(b) by 368 days.

(21) Appl. No.: 18/224,086

(22) Filed: Jul. 20, 2023

(65) Prior Publication Data

US 2024/0030629 A1 Jan. 25, 2024

(30) Foreign Application Priority Data

| | | |
|---|---|---|
| Jul. 20, 2022 | (CN) | 202210862268.0 |
| Dec. 15, 2022 | (CN) | 202211615617.5 |
| Jun. 19, 2023 | (CN) | 202310728890.7 |

(51) Int. Cl.

| | |
|---|---|
| ***H01R 12/53*** | (2011.01) |
| ***H01R 12/57*** | (2011.01) |
| ***H01R 13/11*** | (2006.01) |
| ***H01R 13/516*** | (2006.01) |
| ***H01R 27/02*** | (2006.01) |

(52) U.S. Cl.
CPC ............ *H01R 12/53* (2013.01); *H01R 12/57* (2013.01); *H01R 13/11* (2013.01); *H01R 13/516* (2013.01); *H01R 27/02* (2013.01)

(58) Field of Classification Search
CPC ........ H01R 12/53; H01R 12/57; H01R 13/11; H01R 13/516; H01R 27/02
See application file for complete search history.

(56) References Cited

U.S. PATENT DOCUMENTS 6,824,426 B1 * 11/2004 Spink, Jr. ........... H01R 13/5845 439/579
7,563,108 B1 * 7/2009 Wu ...................... H01R 12/592 439/76.1

(Continued)

FOREIGN PATENT DOCUMENTS

CN 212571566 U 2/2021

*Primary Examiner* — Harshad C Patel
(74) *Attorney, Agent, or Firm* — Bayramoglu Law Offices

(57) ABSTRACT

A cable connector includes: a circuit board; at least one plastic body, fixed on the circuit board, and provided therein with a first socket; a chip, provided on the circuit board; a first set of conductive terminals, held in the first socket of the plastic body, and including first signal terminals; first signal cables, each including one end electrically connected to the first signal terminal and the other end connected to the circuit board and conductively connected to the chip; and a first signal transmission component, conductively connected to the chip. The chip is provided on the circuit board of the cable connector, which achieves convenient mounting and maintenance of the chip. In addition, the cable connector achieves signal function control and configuration through the chip, and thus can achieve multi-performance expansion, improving the access efficiency.

19 Claims, 18 Drawing Sheets

(56) References Cited

U.S. PATENT DOCUMENTS

| | | | | |
|---|---|---|---|---|
| 7,708,587 | B2 * | 5/2010 | Wu | H01R 27/00 439/492 |
| 7,909,652 | B2 * | 3/2011 | Yang | H01R 12/714 439/660 |
| 8,328,579 | B2 * | 12/2012 | Sasaki | H01R 13/659 439/607.25 |
| 9,077,118 | B2 * | 7/2015 | Szu | H01R 13/658 |
| 9,077,136 | B2 * | 7/2015 | Yang | H01R 43/20 |
| 9,225,090 | B2 * | 12/2015 | Chen | H05K 3/361 |
| 9,787,041 | B1 * | 10/2017 | Ke | H01R 12/57 |
| 9,979,139 | B2 * | 5/2018 | Golko | H01R 13/6691 |
| 2008/0214054 | A1 * | 9/2008 | Su | H01R 13/5845 439/637 |
| 2010/0009569 | A1 * | 1/2010 | Su | H01R 24/62 439/552 |
| 2012/0252260 | A1 * | 10/2012 | Tseng | H01R 13/6658 439/499 |
| 2013/0109244 | A1 * | 5/2013 | Chen | H05K 3/34 439/682 |
| 2013/0217261 | A1 * | 8/2013 | Chen | H01R 13/516 439/499 |
| 2014/0213101 | A1 * | 7/2014 | Gomez | H01R 31/065 439/505 |
| 2015/0044911 | A1 * | 2/2015 | Wu | H01R 43/20 29/857 |
| 2015/0255927 | A1 * | 9/2015 | Goh | H01R 13/6471 439/676 |
| 2017/0244449 | A1 * | 8/2017 | Pape | H04B 5/70 |

* cited by examiner

CABLE CONNECTOR

CROSS REFERENCE TO THE RELATED APPLICATIONS

This application is based upon and claims priority to Chinese Patent Applications No. 202210862268.0, filed on Jul. 20, 2022; No. 202211615617.5, filed on Dec. 15, 2022; and No. 202310728890.7, filed on Jun. 19, 2023; the entire contents of which are incorporated herein by reference.

TECHNICAL FIELD

The present disclosure relates to the field of electrical connectors, and in particular to a cable connector.

BACKGROUND

As an electrical connector, cable connectors are used for data transmission between different electronic devices. In chip technology, all interface modules (including the control module) are connected to a matrix backplane, and communication between a plurality of modules can be carried out simultaneously through direct chip-to-chip forwarding. Chip technology has high access efficiency, is suitable for simultaneous multi-point access, provides very high bandwidth, has expandable performance, and is not limited by the central processing unit (CPU) bus and memory technology. The existing chips are generally provided on the server motherboard, but due to the limited space of the server motherboard, chip mounting and maintenance are inconvenient.

In the existing hybrid cable connector, such as the one provided by Chinese patent CN212571566U, a cable is soldered onto a riser board. The riser board is inserted into a pin group, and the cable is conductively connected to the pin group through a wire of the riser board. When a high-speed cable is connected to a circuit board, the signal integrity is easily reduced due to wiring, via holes, and connector losses of the circuit board, thereby leading to unstable impedance of the solder joint. If all cables are connected to connection terminals, a large number of connection terminals are required. Due to the excessive number of the connected cables, miniaturization and lightweight design cannot be achieved, making it hard for the functional settings of the circuit board.

SUMMARY

An objective of the present disclosure is to provide a cable connector that is easy to mount and can achieve signal function control. To achieve the above objective, the present disclosure adopts the following technical solution.

The present disclosure provides a cable connector, including: a circuit board; at least one plastic body, fixed on the circuit board, and provided therein with a first socket; a chip, provided on the circuit board; a first set of conductive terminals, provided in the plastic body, and including first signal terminals, where the first signal terminals each include a first docking portion and a first tail portion; and the first docking portion is located in the first socket; first signal cables, each including one end electrically connected to the first tail portion of the first signal terminal and the other end connected to the circuit board and conductively connected to the chip; and a first signal transmission component, electrically connected to the circuit board and conductively connected to the chip.

The present disclosure further provides a cable connector, including: at least one plastic body, provided therein with a first socket, and provided thereon with a mounting portion, where the mounting portion is fixedly connected to a circuit board with a chip; a first set of conductive terminals, provided in the plastic body, and including first signal terminals, where the first signal terminals each include a first docking portion and a first tail portion; and the first docking portion is located in the first socket; and first signal cables, each including one end electrically connected to the first tail portion of the first signal terminal and the other end connected to the circuit board and conductively connected to the chip on the circuit board.

The present disclosure has the following beneficial effects. The present disclosure provides the chip on the circuit board of the cable connector instead of the server motherboard, saving the space of the server motherboard, facilitating repair, and achieving flexible chip mounting. The present disclosure achieves signal function control and configuration through the chip, and thus can achieve multi-performance expansion and multi-point access, improving the access efficiency.

DETAILED DESCRIPTION OF THE EMBODIMENTS

Figure 1:
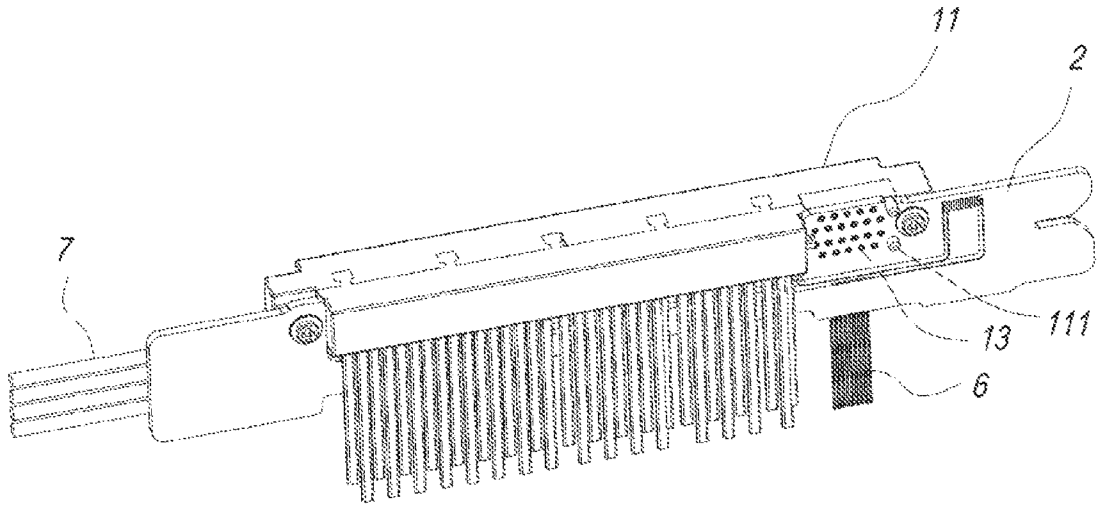
FIG. 1 is a structural diagram of a cable connector according to Embodiment 1 of the present disclosure.
Figure 2:
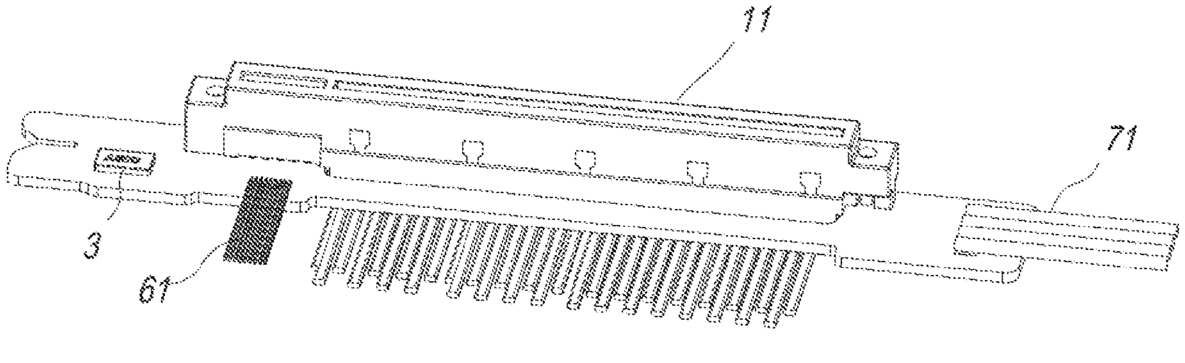
FIG. 2 is a structural diagram of the cable connector from another angle.

The present disclosure provides a cable connector for providing electrical connection between a first electronic device and a second electronic device. The cable connector can also be referred to as an electrical connector, or an electrical connector module. In some examples, the first electronic component may be a peripheral component interface express (PCIe) card, a graphics processing unit (GPU), a network interface card, or a custom card, while the second electronic device may be a target circuit board such as a riser card, a cable connector, or a motherboard.

Embodiment 1

As shown in FIGS. 1 to 19, this embodiment provides a cable connector. The cable connector includes plastic body 11, circuit board 2, chip 3, second signal cables 4, first signal cables 5, first set of conductive terminals 12, a second conductive terminal, a terminal holding mechanism, first signal transmission component 6, and second signal transmission component 7. In this embodiment, there is one plastic body 1.

Figure 4:
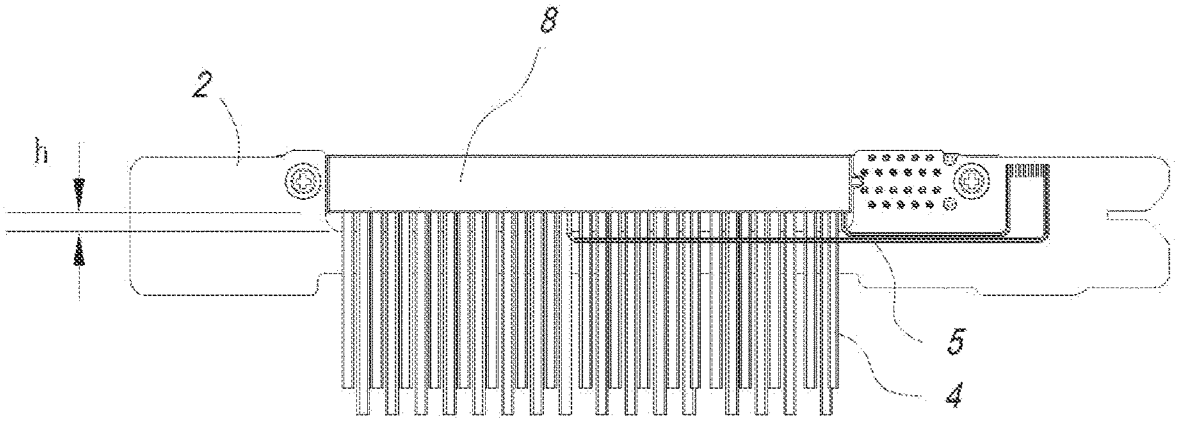
FIG. 4 is a front view of the cable connector according to Embodiment 1 (a first signal connection cable and a power connection cable are not shown)
Figure 7:
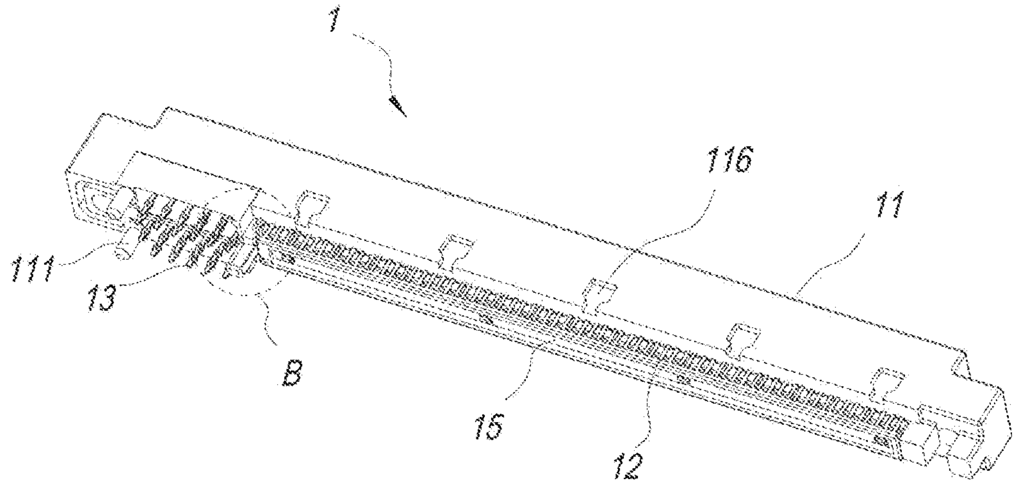
FIG. 7 is a structural diagram of the plastic body.
Figure 8:
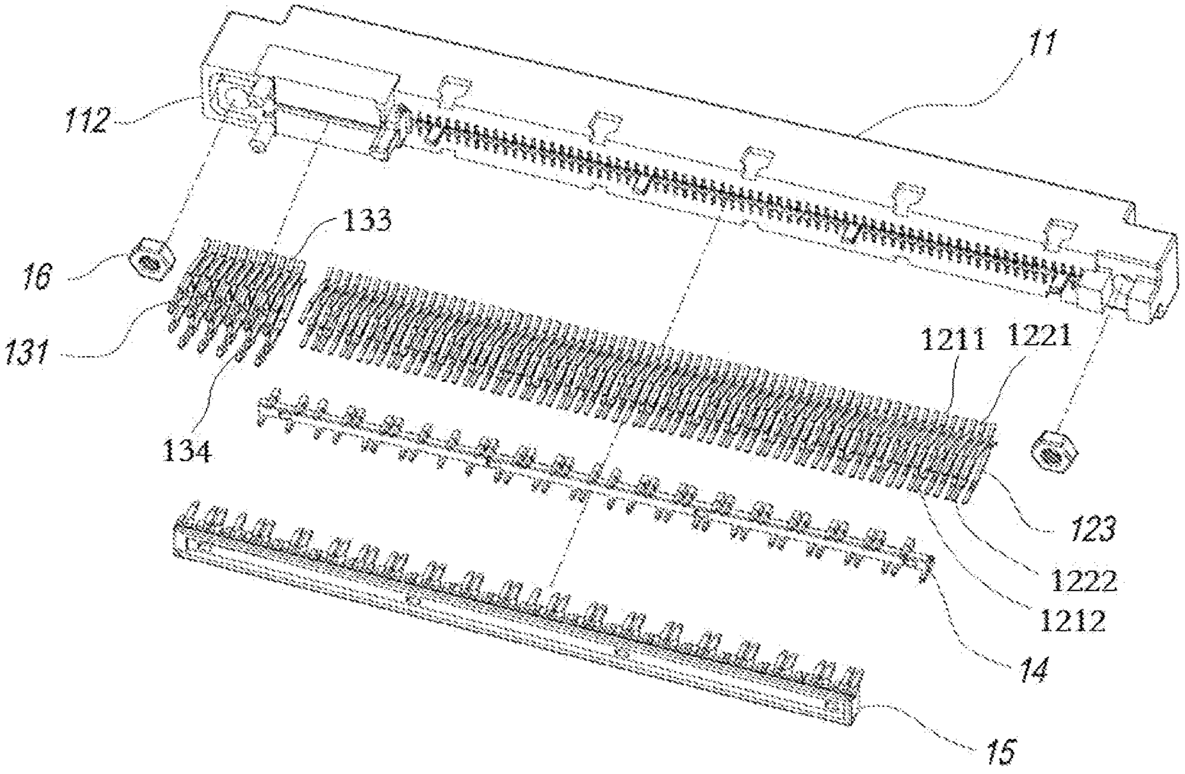
FIG. 8 is an exploded view of the plastic body shown in FIG. 7.

As shown in FIGS. 7 to 8, the first set of conductive terminals 12, the second conductive terminal, and the terminal holding mechanism are provided on the plastic body 1. The first set of conductive terminals 12 includes side-by-side second signal terminals 121, first signal terminals 122, and grounding terminals 123. In this embodiment, the second signal terminals 121 are configured to transmit a high-speed signal or a differential signal, the first signal terminals 122 are configured to transmit a sideband signal, and the second conductive terminal 13 is a power terminal 131. In some embodiments, the first signal terminal 122 and the second conductive terminal can also be terminals for transmitting a low-speed signal or a control signal. The second signal cables 4 are high-speed signal cable, and the first signal cables 5 are sideband signal cables. FIG. 4 only shows two first signal cables 5, while the remaining first signal cables are not shown. The high-speed signal refers to a signal with a rising or falling edge time less than 100 ps, or a signal transmitted along a transmission path and likely to experience a severe skin effect and ionization loss, such as a signal used in PCIe Gen3, PCIe Gen4, PCIe Gen5, PCIe Gen6, SAS4.0, 10G, or above Ethernet. The sideband signal can be a differential signal, and refers to a modulated signal.

The plastic body 11 is made of an insulating material. Examples of the insulating material suitable for preparing the plastic body 11 include but are not limited to plastics and nylon.

Figure 3:
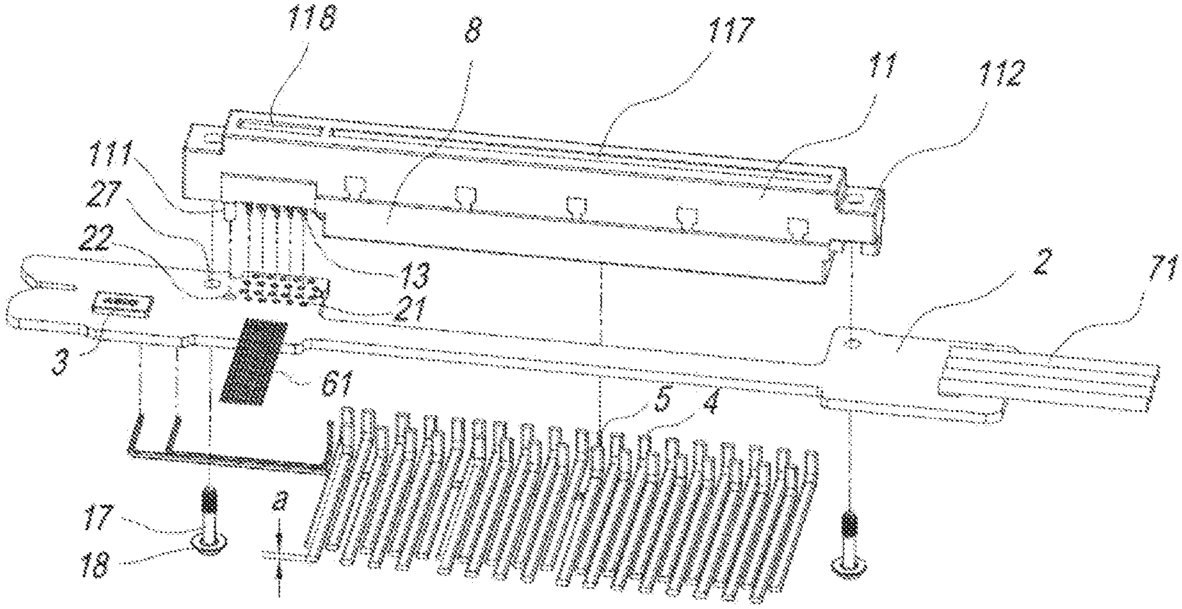
FIG. 3 is an exploded view of the cable connector shown in FIG. 2.

As shown in FIG. 3, a docking side of the plastic body 11 is provided with first socket 117 and second socket 118. The first signal terminal 122 includes first docking portion 1221 and first tail portion 1222. The second signal terminal 121 includes second docking portion 1211 and second tail portion 1212. The first docking portion 1221, the second docking portion 1211, and the second signal terminal 121 are provided in the first socket 117. The second conductive terminal 13 includes docking end 133 and contact end 134. The docking end 133 is provided in the second socket 118. The first socket 117 and the second socket 118 extend into the plastic body, such that the first set of conductive terminals 12 is held in the plastic body 11. The first docking portion 1221 and the second docking portion 1211 of the first set of conductive terminals 12 can be contacted with a first conductive portion of the first electronic device through the first socket 117. The docking end 133 of the second conductive terminal 13 can be contacted with a second conductive portion of the first electronic device through the second socket 118. The first electronic device can be a solid-state drive (SSD), a GPU, a network interface card (NIC), and other add-in cards. The add-in card can be docked with the plastic body 11 from the docking side. The first conductive portion of the add-in card (usually located at an edge of the add-in card or a pad nearby) is inserted into the plastic body 11 through the first socket or the second socket to contact with the first set of conductive terminals 12, thereby establishing an electrical connection. For another example, the first electronic device can also be a pin connector configured to mate with the plastic body 11. A pin portion of the pin connector is inserted into the plastic body 11 through the first socket 117, such that the first conductive portion of the pin connector contacts with the first set of conductive terminals 12, thereby establishing an electrical connection.

Figure 25:
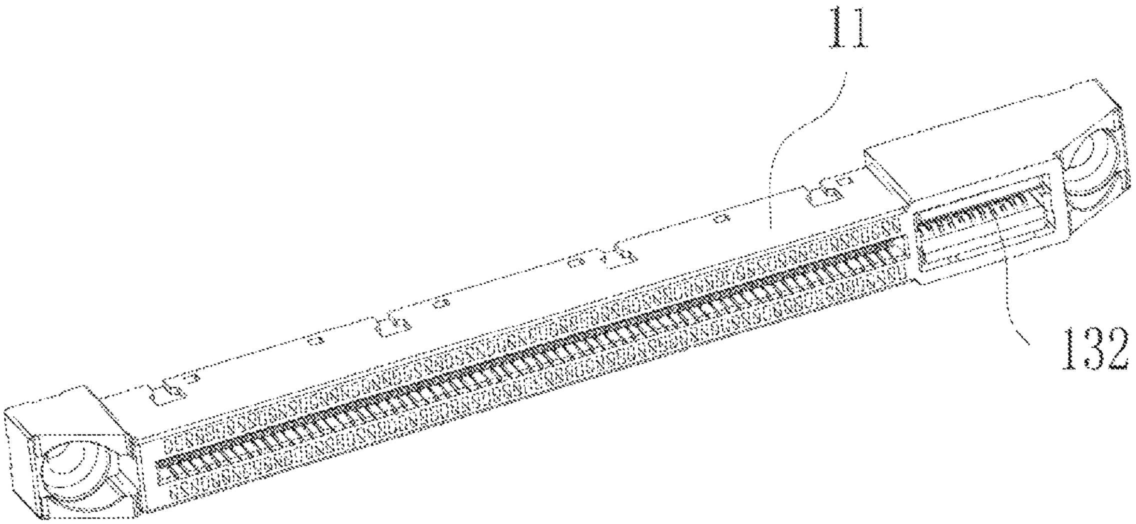
FIG. 25 is a schematic diagram of a power terminal provided on a terminal connector.
Figure 26:
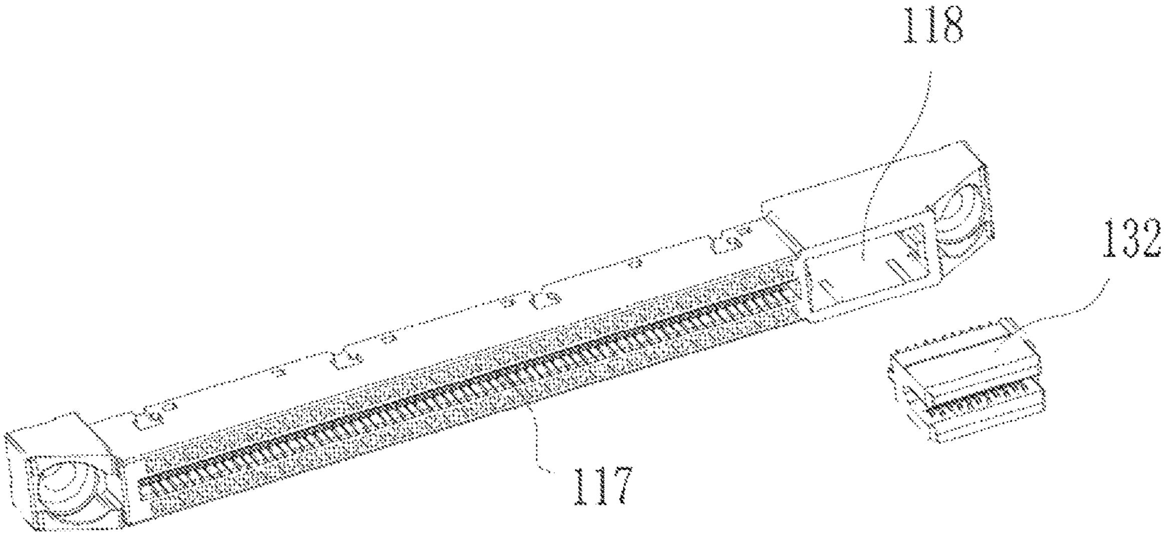
FIG. 26 is an exploded view of the power terminal and the terminal connector shown in FIG. 25.

As shown in FIGS. 25 and 26, in other embodiments, the first docking portion 1221 and the second docking portion 1211 are provided in the first socket 117, the docking end 133 of the second conductive terminal 13 is provided on terminal connector 132, and the terminal connector 132 is provided in the second socket 118.

Figure 10:
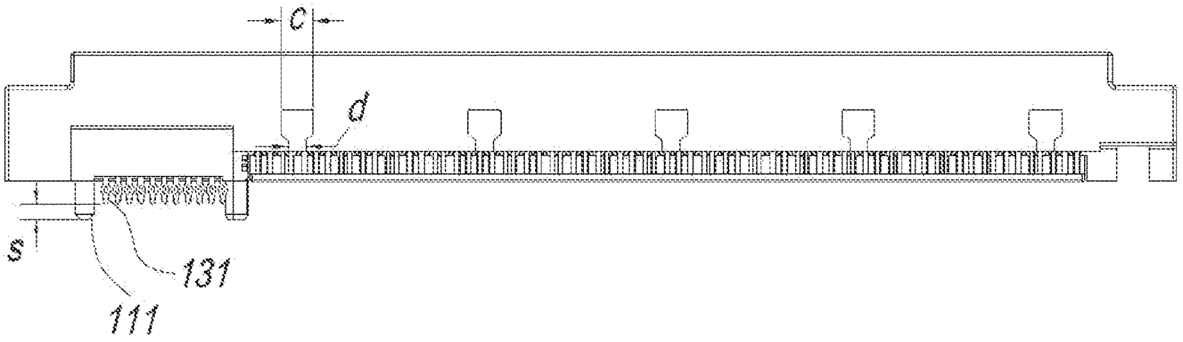
FIG. 10 is a front view of the plastic body.

As shown in FIGS. 7 and 8, in some embodiments, the second conductive terminal 13 may include a plurality of press-fit terminals for easy insertion. The press-fit terminals are directly inserted into the circuit board to establish the electrical connection, making it simpler and more reliable. The plastic body 11 is provided with three positioning posts 111 on two sides of the press-fit terminals. As shown in FIG. 3, the circuit board 2 is provided with contact holes 21 and positioning slots 22. The positioning posts 111 are inserted into the positioning slots 22, and the press-fit terminals are inserted into the contact holes 21 to achieve the electrical connection to the circuit board 2. As shown in FIG. 10, an end of the positioning post 111 protrudes from the press-fit terminal, creating height difference s between the end of the positioning post 111 and the end of the press-fit terminal. Through the height difference s, when the press-fit terminal is mounted, the positioning post 111 is first inserted into the positioning slot 22 of the circuit board 2, preventing damage caused by collision or tilting to the press-fit terminal.

Figure 13:
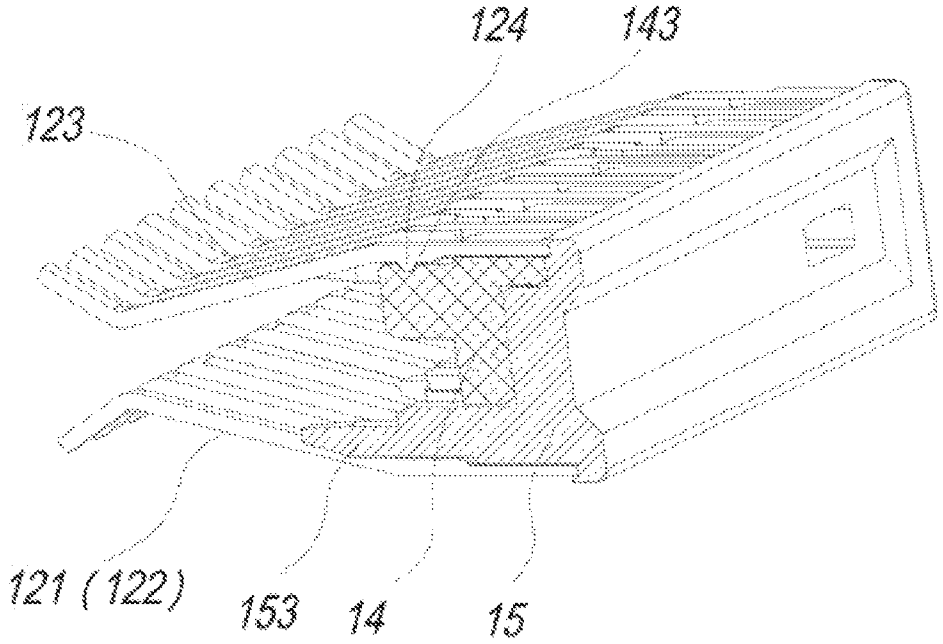
FIG. 13 is a partial perspective view of a first set of conductive terminals.

As shown in FIG. 13, the grounding terminals 123, the first signal terminals 122, and the second signal terminals 121 are arranged in rows within the first socket 117. The terminal layout follows the specifications of PCIe cards. The first signal terminals 122, the second signal terminals 121, as well as the first signal terminal 122 and the second signal terminal 121, are separated by the grounding terminal 123.

The terminal holding mechanism includes conductive component 14 and insulating rear plug 15 surrounding the conductive component 14. The grounding terminals 123 are conductively connected through the conductive component 14. The terminal holding mechanism is attached to the plastic body 11 to hold the grounding terminals 123, first signal terminals 122 and second signal terminals 121 in the plastic body 11. The grounding terminals 123 are connected together through the conductive component 14 to provide a conductive path between the grounding terminals 123. In this way, unwanted resonance occurring in the grounding terminals 123 during the operation of the electrical connector can be controlled or suppressed, thereby improving signal integrity. The conductive component 14 can be made of a metal, a conductive plastic, or any other suitable material.

Figure 14:
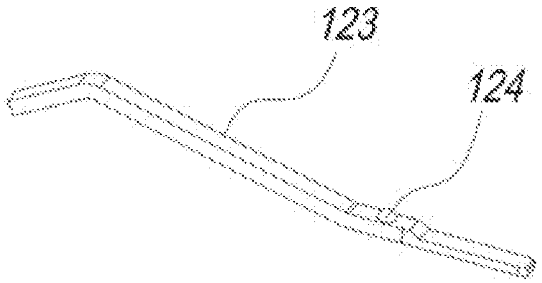
FIG. 14 is a schematic diagram of a grounding terminal.
Figure 15:
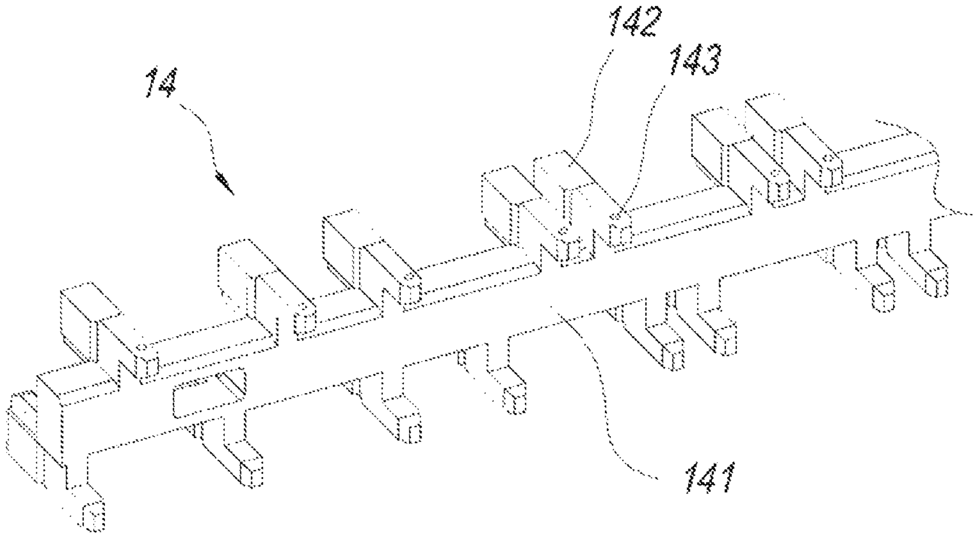
FIG. 15 is a schematic diagram of a conductive component.

As shown in FIG. 14, the grounding terminal 123 is provided with protrusion 124. As shown in FIG. 15, the conductive component 14 includes connection body 141 and contact arm 142 protruding from the connection body 141 and corresponding to a position of the grounding terminal 123. The contact arm 142 is provided with dimple 143. An end of the grounding terminal 123 is overlapped on the contact arm 142, and the protrusion 124 is inserted into the dimple 143 to achieve an interference fit. Through the interference fit, a stable contact between the grounding terminal 123 and the conductive component 14 is achieved, and all the grounding terminals 123 are conductively connected together, improving the signal integrity of the product.

Figure 9:
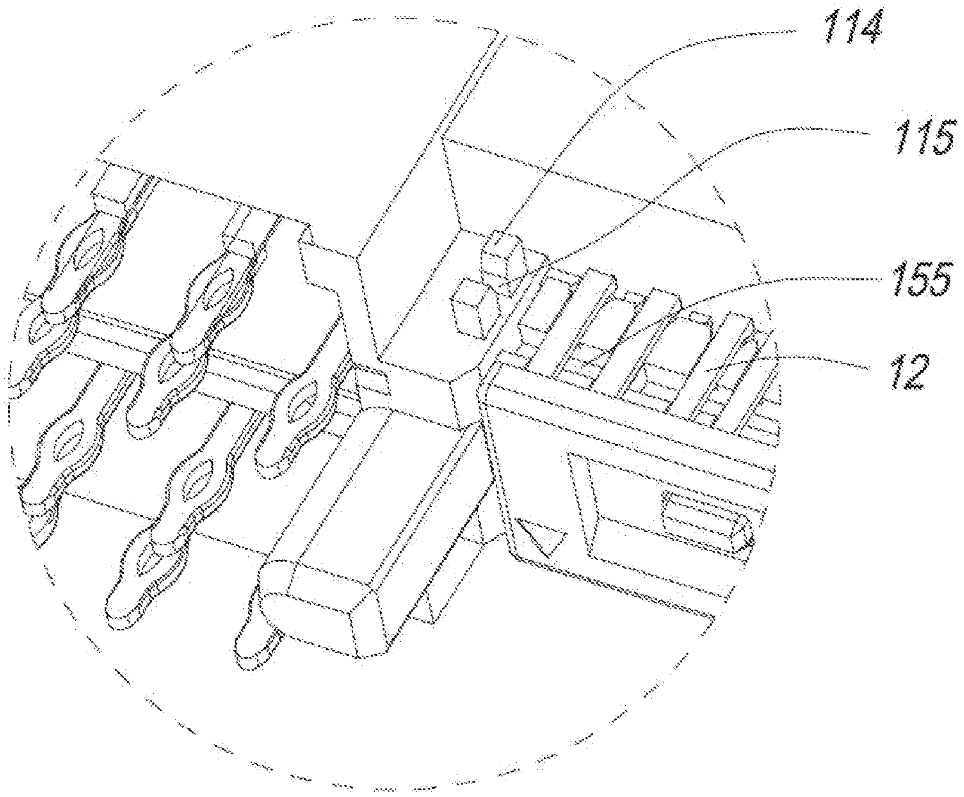
FIG. 9 is an enlarged view of B shown in FIG. 7.
Figure 16:
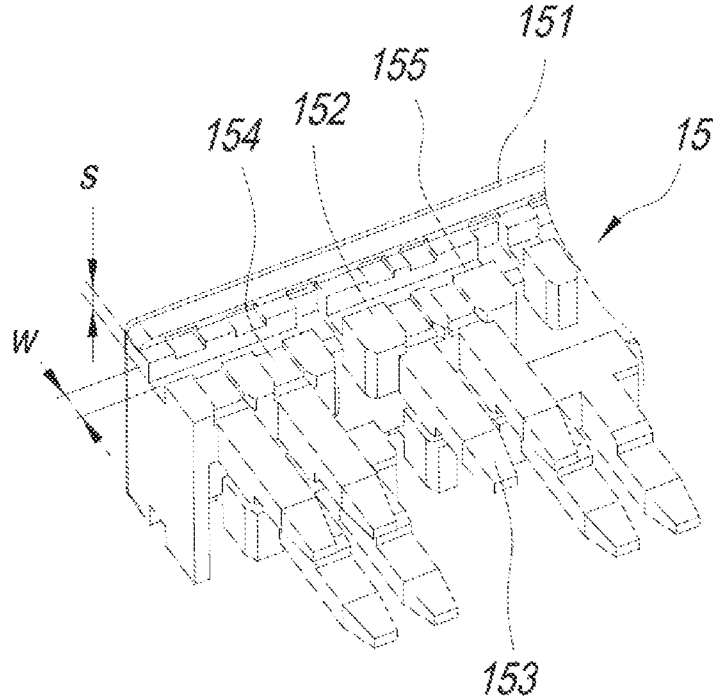
FIG. 16 is a schematic diagram of an insulating rear plug.

As shown in FIG. 16, the insulating rear plug 15 includes base portion 151, partition portion 152, and support arms 153. The partition portion 152 protrudes from the base portion 151. The partition portion 152 is provided with a plurality of stepped grooves 154 and avoidance groove 155. The second signal terminals 121, the first signal terminals 122, and the grounding terminals 123 are provided in the stepped grooves 154 and separated from each other. The avoidance groove 155 is correspondingly provided below a soldering position of the first signal terminals 122 and the second signal terminals 121, and the avoidance groove 155 is perpendicular to the stepped groove 154. The avoidance groove 155 has depth s of 0.1-3.0 mm and width w of 0.10-3.0 mm. As shown in FIG. 9, the avoidance groove 155 (in a hollowed-out state) is provided in the insulating rear plug below a soldering zone of a pad of the first set of conductive terminals 12. It can prevent plastic carbonization caused by a high temperature during laser soldering, so as to avoid high voltage/poor insulation due to a short circuit formed between the insulating rear plug 15 and the first set of conductive terminals 12 after plastic carbonization. The support arms 153 protrude from the partition portion 152, and the second signal terminals 121 and the first signal terminals 122 are overlapped on the support arms 153. As shown in FIG. 13, the support arms 153 are configured to support the first signal terminals 121 and the second signal terminals 122 so as to prevent them from being excessively deformed.

Figure 6:
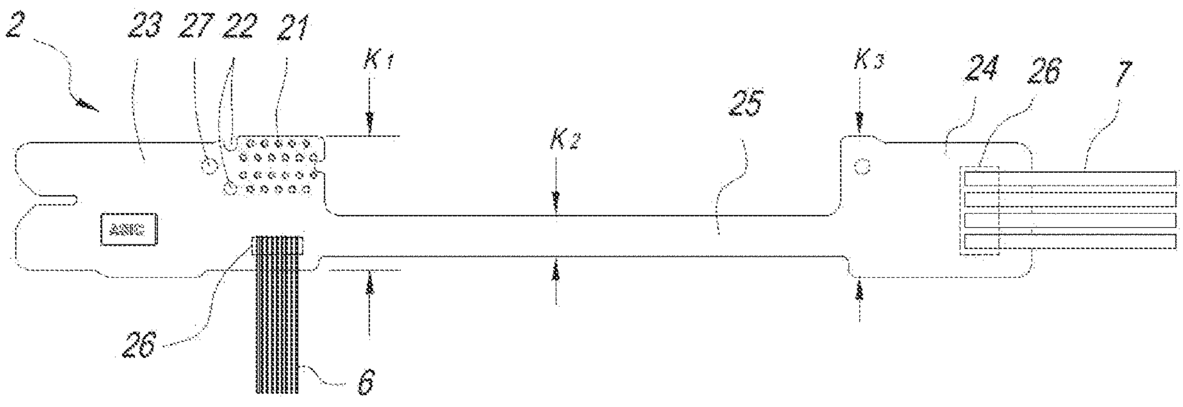
FIG. 6 is a schematic diagram of a circuit board.

As shown in FIG. 6, in this embodiment, the circuit board 2 is an integrated board. The circuit board 2 includes first end portion 23, second end portion 24, and connecting portion 25. The connecting portion 25 connects the first end portion 23 to the second end portion 24. Width K2 of the connecting portion 25 is smaller than width K1 of the first end portion and width K3 of the second end portion. The first end portion 23 and the second end portion 24 are fixed on two side ends of the plastic body 11, respectively. The first end portion 23 and the second end portion 24 each are provided with pad 26.

The chip 3 is connected to the circuit board 2. In this embodiment, the chip 3 can be an application specific integrated circuit (ASIC) chip. The chip 3 can be configured according to a user need to process a first signal transmitted by the first signal cable 5, thereby diversifying the functions of an electronic system. In the present disclosure, with the help of this configuration, the cable connector can transmit and process the first signal between the first electronic device and the second electronic device. The chip 3 is provided on the circuit board 2 instead of a target circuit board such as a motherboard, thereby saving space of the target circuit board. In some examples, the chip 3 is configured for at least one of the following purposes: input/output (IO) port expansion; electrically erasable programmable read-only memory (EEPROM), such as for updating firmware (FW); and processing a sensor signal, such as a temperature signal. In these examples, the chip 3 can include an IO port expansion chip, an EEPROM, a sensor chip, or a combination thereof. In other examples, the chip 3 can be a single chip integrating these functions.

The first signal transmission component 6 can be a first signal connection cable, including one end soldered onto the circuit board 2 to conduct with the chip 3 and the other end electrically connected to the second electronic device. The second signal transmission component 7 can be a second signal connection cable, including one end soldered to the circuit board 2 and the other end electrically connected to a corresponding conductive portion of the second electronic device. In some examples, the second electronic device can be a riser card, and the end of the first signal connection cable is connected to a corresponding signal pad of the riser card. The riser card can also be inserted into a card edge connector located on a target circuit board, such as a motherboard. In this way, the first electronic device can be connected to the target circuit board. In other examples, the second electronic device can be a cable connector, and the end of the first signal connection cable is connected to a corresponding signal terminal of the cable connector. In some other examples, the second electronic device can be a target circuit board such as a motherboard, and the end of the first signal connection cable is connected to a corresponding signal pad of the target circuit board. It should be understood that the present disclosure is not limited herein.

Figure 20:
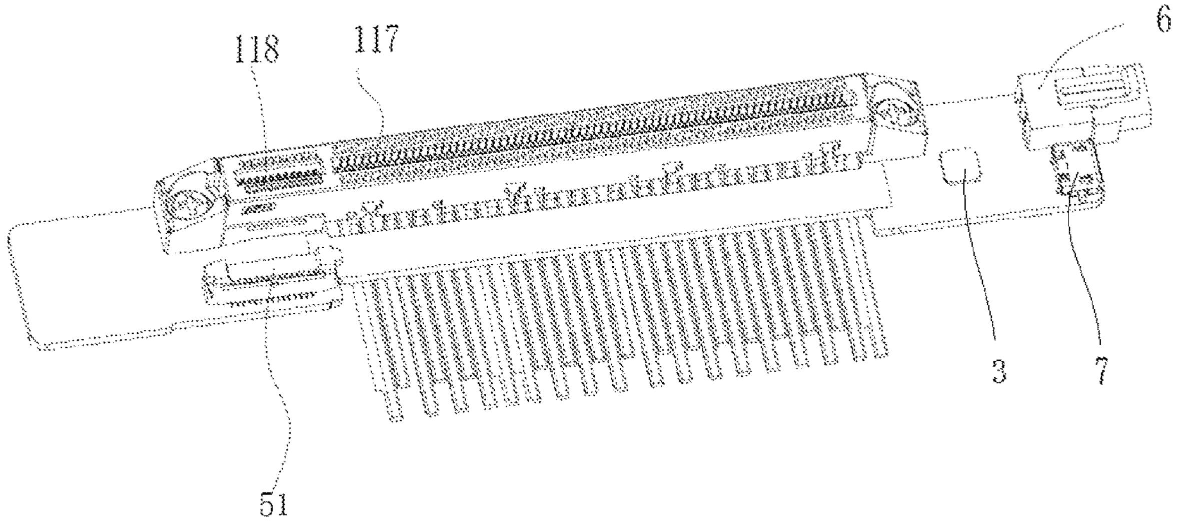
FIG. 20 is a structural diagram of a cable connector according to another embodiment of the present disclosure (some components are not shown)
Figure 22:
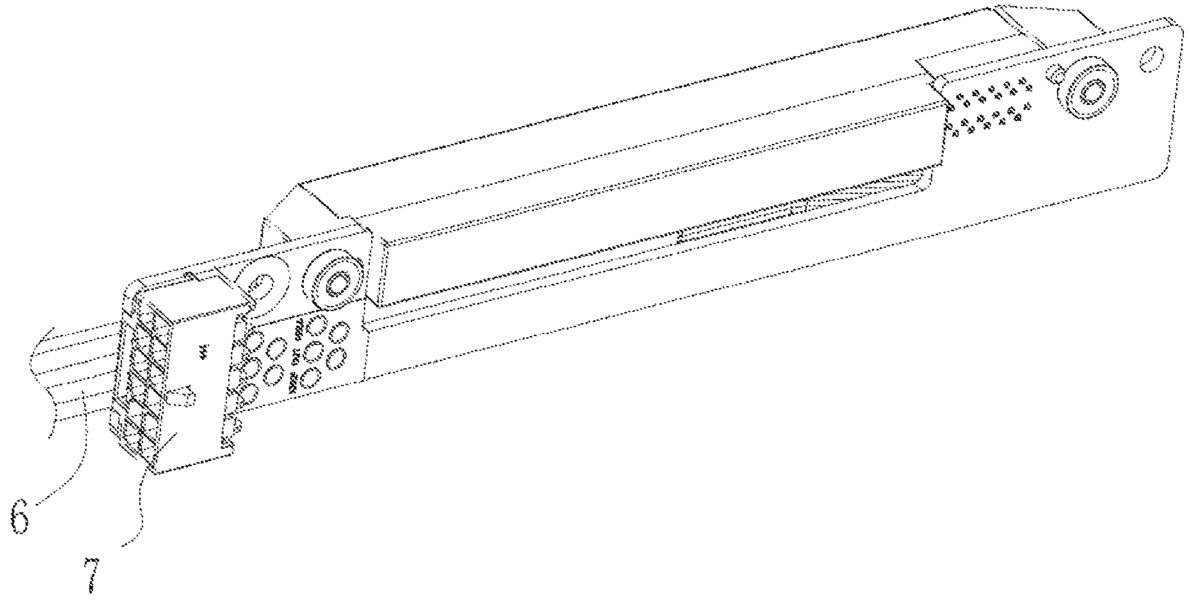
FIG. 22 is a structural diagram of a cable connector according to an embodiment of the present disclosure (some components are not shown)

As shown in FIG. 20, in other embodiments, the first signal transmission component 6 and the second signal transmission component 7 can be configured as a first connector and a second connector, respectively. In this case, when in use, the signal is transmitted to the second electronic device through the insertion of the mated connector. Alternatively, as shown in FIG. 22, the first signal transmission component 6 and the second signal transmission component 7 can each be provided with a first signal connection cable and a connector, through which the signal is transmitted to the second electronic device. In other embodiments, the first signal transmission component 6 and the second signal transmission component 7 can also be gold fingers provided on the circuit board, which are directly inserted into the second electronic device in use.

Figure 11:
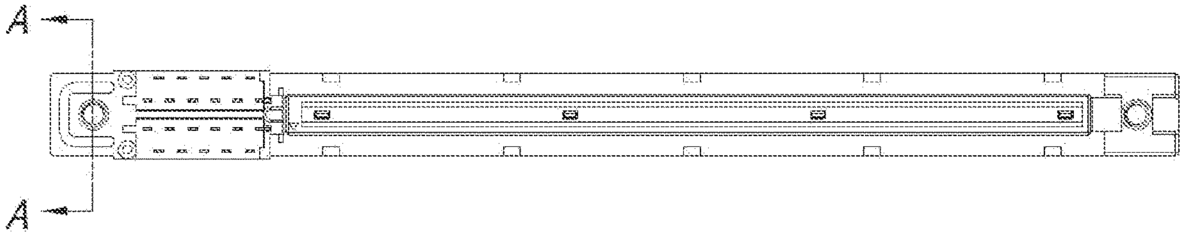
FIG. 11 is a bottom view of the plastic body shown in FIG. 10.
Figure 12:
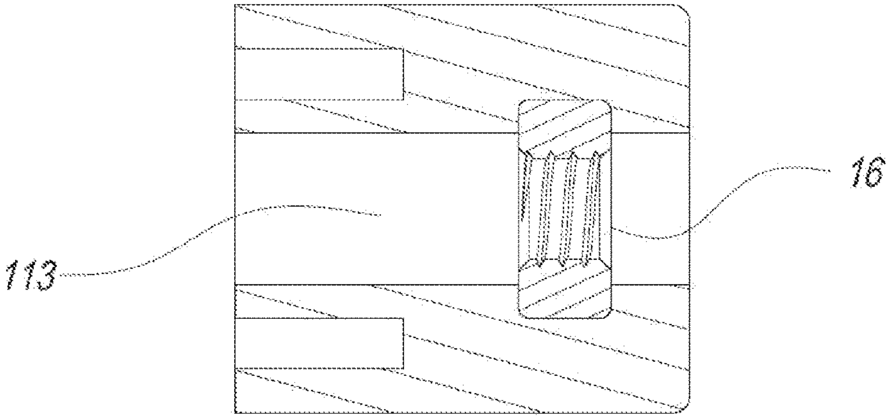
FIG. 12 is a section view taken along line A-A shown in FIG. 11.

As shown in FIGS. 11 and 12, two side ends of the plastic body 11 are provided with mounting portions 112, respectively. The mounting portions 112 each are provided therein with straight slot 113, and the straight slot is embedded with a first fastener. In this embodiment, the first fastener is nut 16. As shown in FIG. 3, the circuit board 2 is fixed to the mounting portion 112 through a second fastener. In this embodiment, the second fastener is bolt 17. The circuit board 2 is provided with through-hole 27. The bolt 17 passes through the through-hole 27 and is locked with nut 16 in the straight slot 113. In the present disclosure, the nut 16 is embedded in the plastic body 11 of the cable connector to facilitate mounting and improve connection strength.

Figure 21:
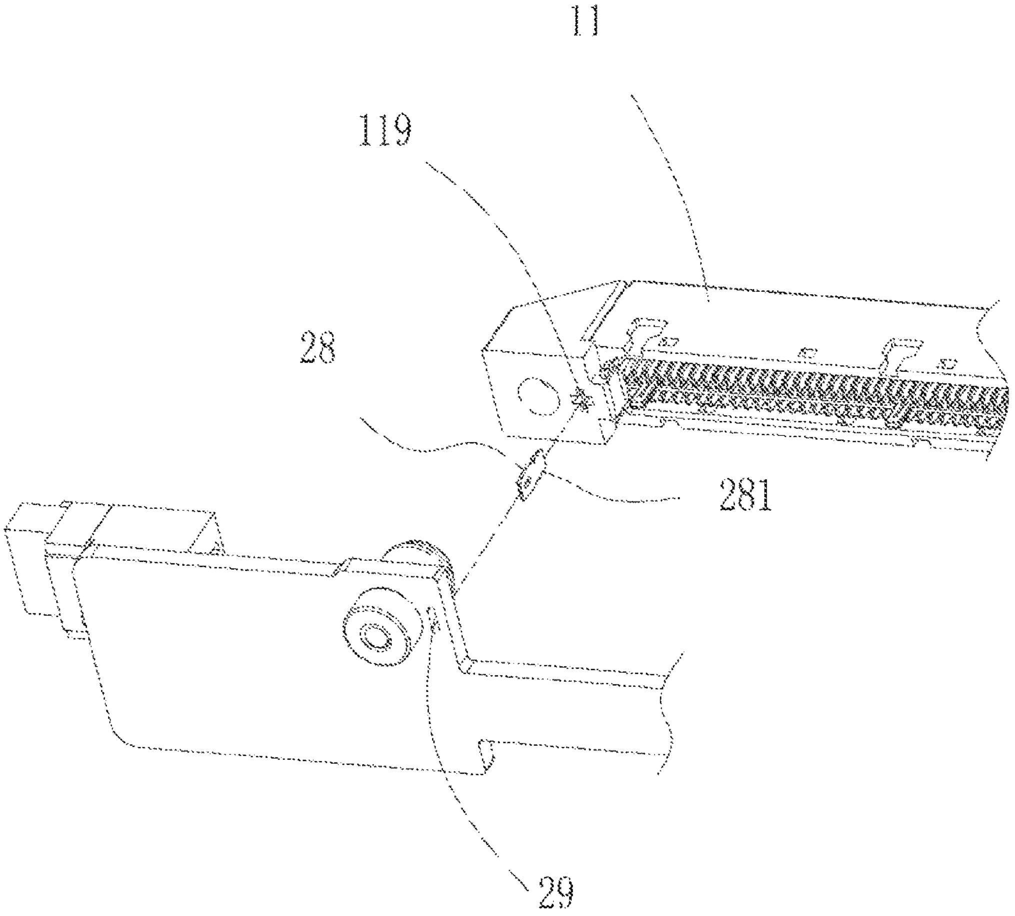
FIG. 21 is a schematic diagram of connecting a positioning piece to a plastic body and a circuit board.

As shown in FIG. 21, in order to facilitate the positioning of the plastic body 11, the cable connector further includes positioning piece 28. One end of the positioning piece 28 is provided with flange 281. Clamping groove 119 is provided in a lower side of the plastic body 11, and inserting slot 29 is provided in the circuit board. The flange 281 of the positioning piece 28 is clamped into the clamping groove 119 of the plastic body 11. The other end of the positioning piece 28 passes through the inserting slot 29 to achieve positioning.

In other embodiments, the plastic body 11 is not provided with the mounting portion 112, and the circuit board 2 and the plastic body 11 are not fixed by the bolt and the nut, but are directly soldered by the positioning piece 28.

As shown in FIGS. 7 and 9, the signal cable and the signal terminal can be soldered through a hotBar process. The mounting portion 112 of the plastic body 11 is provided with a soldering wire positioning mechanism. A soldering wire is generally made of a tin wire. In this embodiment, the soldering wire positioning mechanism includes two fixing members 114. Soldering wire fixing slot 115 is formed between the two fixing members 114. The soldering wire fixing slot 115 is configured to fix a tin wire for soldering. During soldering, the tin wire is clamped in the soldering wire fixing slot 115 and placed along a surface of the first set of conductive terminals 12. The second signal cable 4 and the first signal cable 5 are placed on the tin wire. Soldering is performed to connect the second signal cable 4 to the second signal terminal 121 and the first signal cable 5 to the first signal terminal 122.

Figure 5:
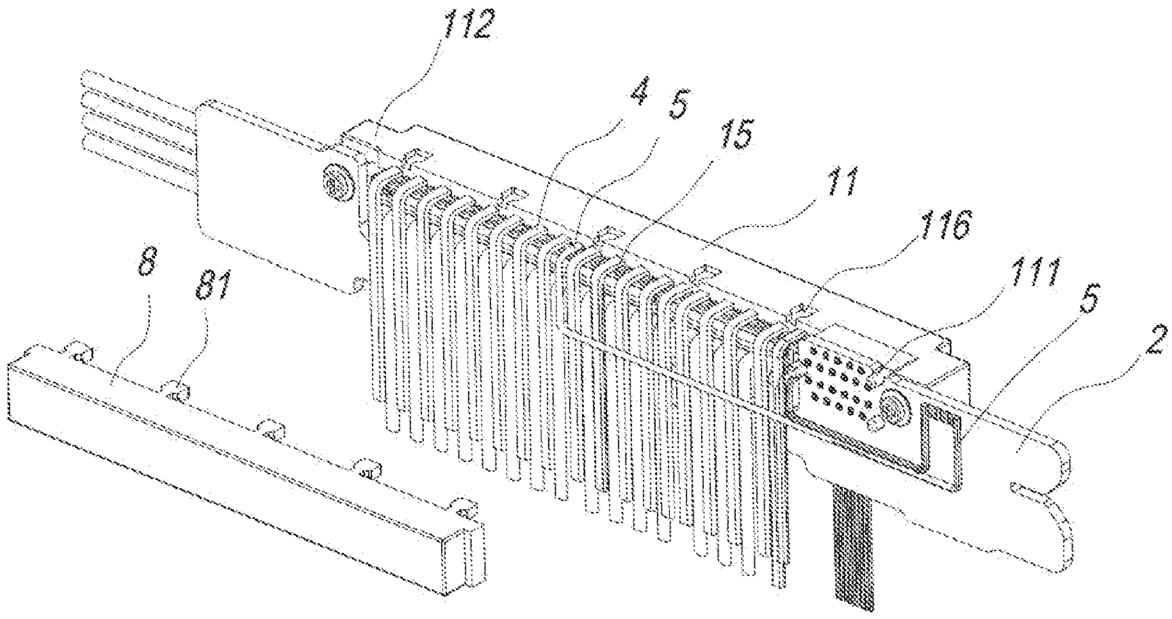
FIG. 5 is an exploded view of a plastic body and an outer mold.

As shown in FIG. 5, outer mold 8 is injection-molded in a soldering zone of the second signal cable 4, the first signal cable 5, and the first set of conductive terminals 12. An insulating material suitable for the outer mold 8 can be a plastic, nylon, etc. The outer mold 8 is molded onto the plastic body 11 to cover a connecting portion between the insulating rear plug 15 as well as the first signal terminal 122 and the first signal cable 5, a connecting portion between the second signal terminal 121 and the second signal cable 4, and a connecting portion between the grounding terminal 123 and a grounding cable. In some examples, upper and lower sides of the plastic body are provided with grooves 116. The outer mold 8 fills the grooves 116 to form clamping members 81 with the grooves 116. The clamping members are fit with the grooves, so as to fix the outer mold 200 to the plastic body 11.

As shown in FIG. 4, the connecting portion 25 of the circuit board 2 is located inside bent sides of the second signal cable 4 and the first signal cable 5. There is gap h between the connecting portion 25 and an end of the outer mold 8. A thickness of each of the second signal cable 4 and the first signal cable 5 is set to a (as shown in FIG. 3), and the gap h ranges from to la to 10$a$. The gap h is provided to facilitate the mounting of the circuit board 2.

A mounting process of this embodiment is detailed below.

(1) The first signal terminals 122, the second signal terminals 121, and the second conductive terminals 13 are provided on the plastic body 11. The second signal cables 4 are soldered to the second tail portions 1212 of the second signal terminals 121, and the first signal cables 5 are soldered to the first tail portions 1222 of the first signal terminals 122.

(2) The second signal cables 4 and the first signal cables 5 are bent downwards.

(3) As shown in FIG. 5, the outer mold 8 is injection-molded in the soldering zone of the second signal cables 4, the first signal cables 5, and the first set of conductive terminals 12. When the outer mold 8 is injection-molded onto the plastic body 11, a colloid fills the grooves 116 to form the clamping members 81. As shown in FIG. 10, internal width c of the groove 116 is greater than outlet width d of the groove 116, making it impossible for the clamping member 81 to detach from the groove 116.

Figure 17:
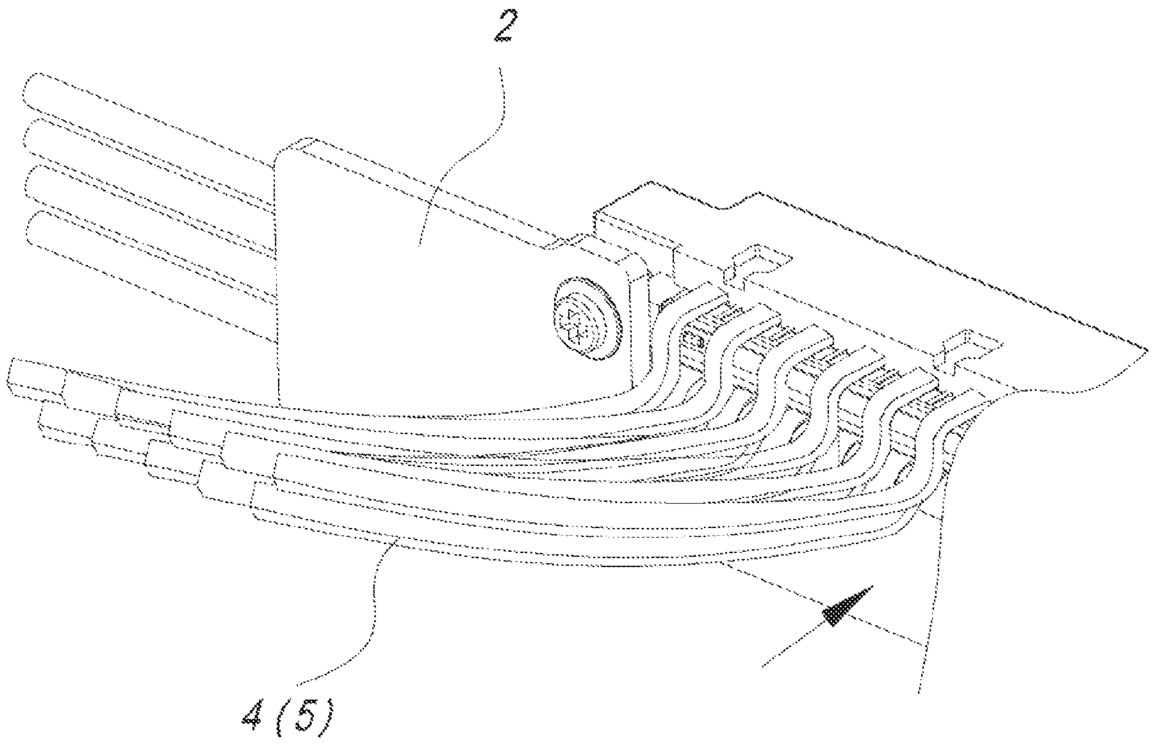
FIG. 17 is a schematic diagram of mounting of the circuit board.

(4) As shown in FIG. 17, the second signal cables 4 are folded outward, and circuit board 2 is provided (in the direction of the arrow shown in FIG. 17). The signal cables are bent to reduce the volume of the cable connector. The gap h is provided to prevent interference with the signal cables during the mounting of the circuit board 2. When the circuit board 2 is mounted, the positioning posts 111 are inserted into the positioning slots 22, and the press-fit terminals are inserted into the contact holes 21 to achieve electrical contact with the circuit board 2.

(5) The bolts 17 and washers 18 on the two sides are mounted, and the bolt 17 passes through the through-hole 27 and is locked with the nut 16 in the straight slot 113.

(6) After the circuit board 2 is mounted, the other ends of the first signal cables 5 are soldered to the pad of the circuit board 2. As shown in FIG. 20, for ease of assembly, third connector 51 can be provided on the circuit board 2. The first signal cables 5 are electrically connected to the circuit board 2 through the third connector 51.

The chip 3 can be pre-mounted on the circuit board 2, and the first signal transmission component 6 and the second signal transmission component 7 are soldered onto the pad.

Figure 18:
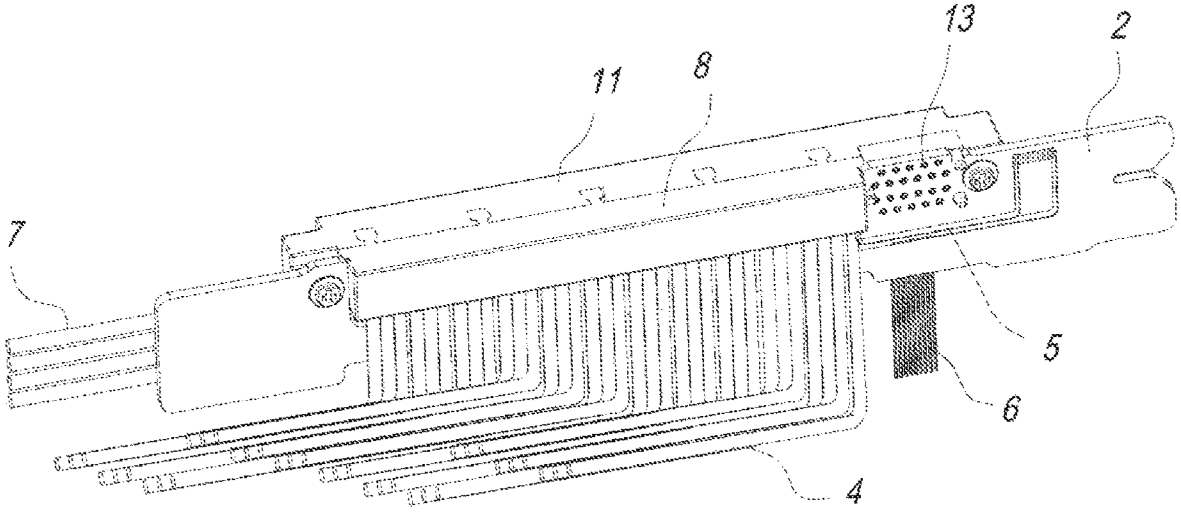
FIG. 18 is a schematic diagram of bending first signal cables and second signal cables towards an outgoing direction.

(7) As shown in FIG. 18, the second signal cables 4 and the first signal cables 5 are bent towards an outgoing direction.

In other embodiments of the present disclosure, surface mount technology (SMT) assembly can be used In the present disclosure, the chip 3 is provided on the circuit board 2. The chip 3 is connected to the first signal cables 5, thereby controlling the function and configuration of the sideband signal through the chip 3, achieving flexible and convenient product solution design. The first signal cables 5 are connected to the circuit board 2, and are connected to a circuit board such as a riser card through the first signal connection cable. This can reduce insertion loss, reduce signal attenuation, improve impedance stability on the signal transmission path, and thus improve the signal transmission performance of the electrical connector.

In the present disclosure, there are two situations for the signal connection of a power supply.

(1) The second conductive terminal 13 is connected to the circuit board 2, and is directly connected to the second signal transmission component 7 through a wire of the circuit board 2.

(2) The second conductive terminal 13 is connected to the circuit board 2, and is conductively connected to the chip 3. The chip 3 is connected to the second signal transmission component 7 through a wire of the circuit board 2. This method can control the function and configuration of a power signal through the chip 3.

Embodiment 2

Figure 19:
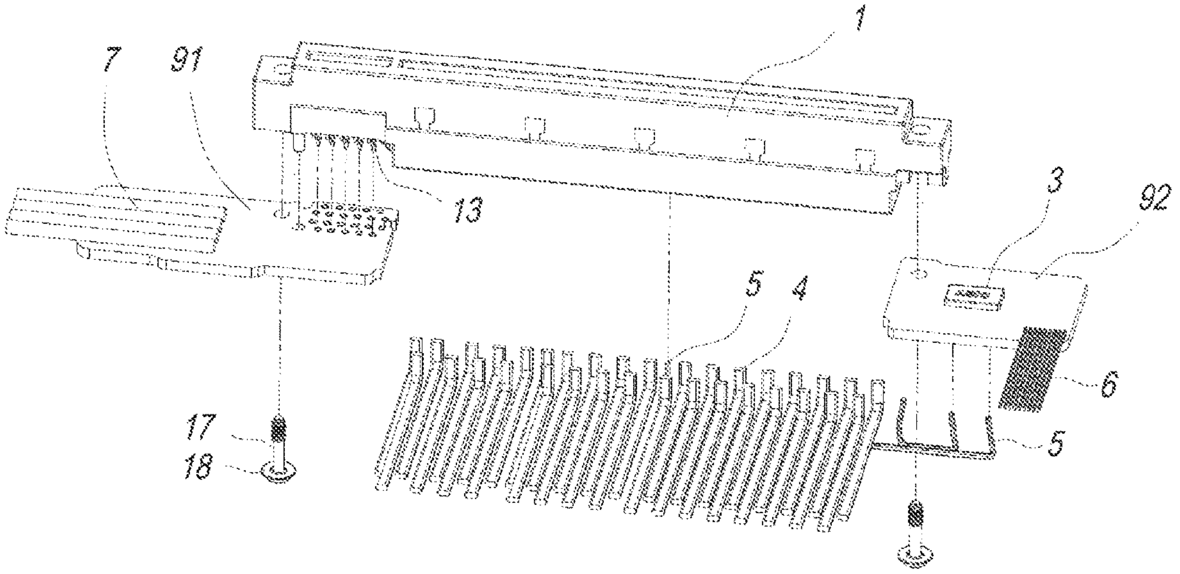
FIG. 19 is a structural diagram of a cable connector according to Embodiment 2 of the present disclosure.

As shown in FIG. 19, the difference between this embodiment and Embodiment 1 is that there are two circuit boards in this embodiment, namely first circuit board 91 and second circuit board 92 fixed on two side ends of the plastic body 11.

The first circuit board 91 is electrically connected to the second conductive terminal 13, and is connected to the second signal transmission component 7. The second signal cables 4 are soldered onto the second signal terminals 121.

Embodiment 3

Figure 23:
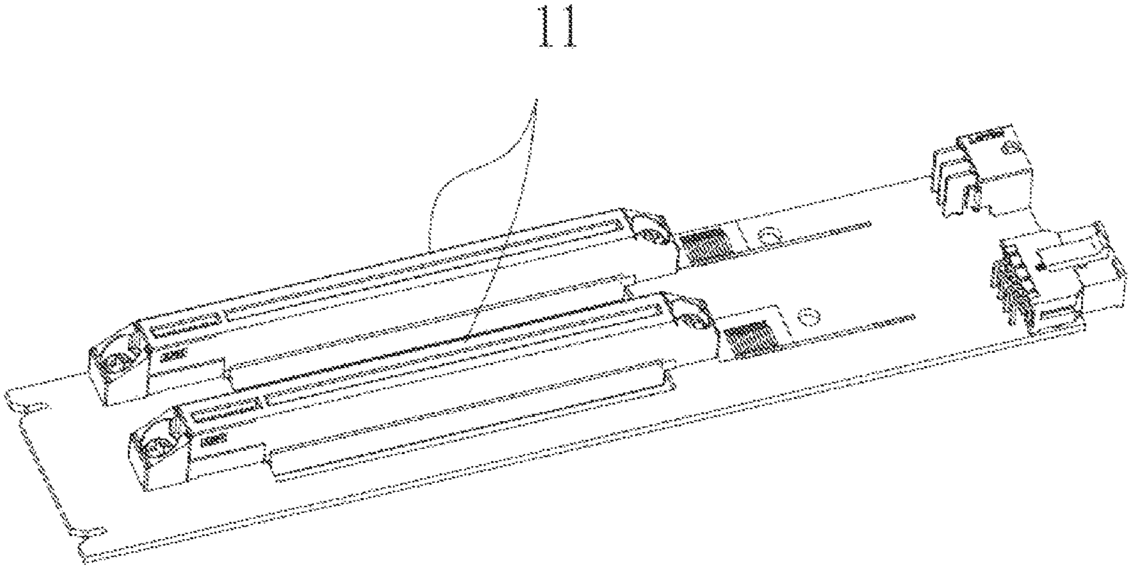
FIG. 23 is a structural diagram of a cable connector according to Embodiment 3 of the present disclosure.
Figure 24:
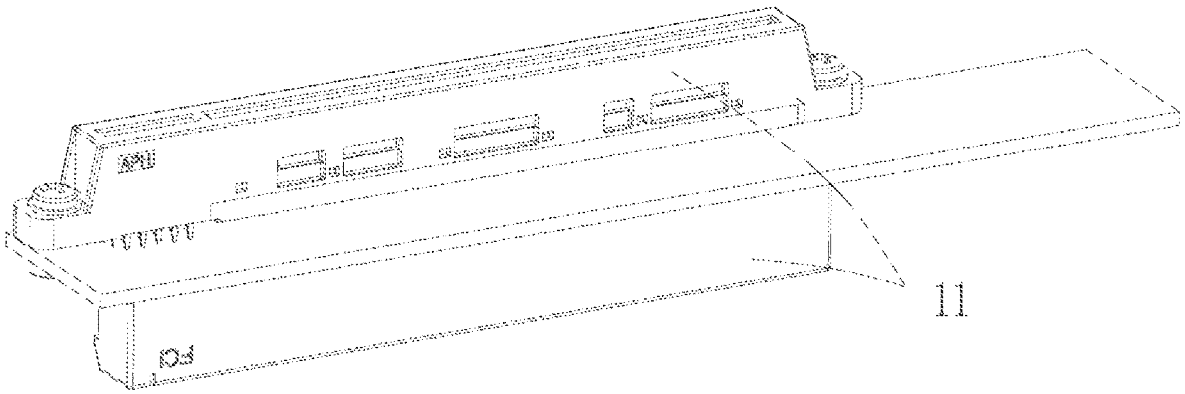
FIG. 24 is another structural diagram of the cable connector according to Embodiment 3 of the present disclosure.

As shown in FIGS. 23 and 24, the difference between this embodiment and Embodiment 1 is that in this embodiment, there are two plastic bodies 11, which are respectively provided on one side of the circuit board 2 or on two sides of the circuit board 2.

In this embodiment, the first signal terminals 122, the second signal terminals 121, and the second conductive terminal 13 are provided inside each plastic body 11. That is, the two plastic bodies 11 with the same configuration are provided on the circuit board 2. Alternatively, the first signal terminals 122 are provided in one of the plastic bodies 11, the second signal terminals 121 are provided in the other plastic body 11, and the second conductive terminal 13 is only provided in one of the plastic bodies 11.

Embodiment 4

As shown in FIGS. 27 to 34, the difference between this embodiment and Embodiments 1 to 3 is that in this embodiment, the cable connector does not include a circuit board.

Figure 27:
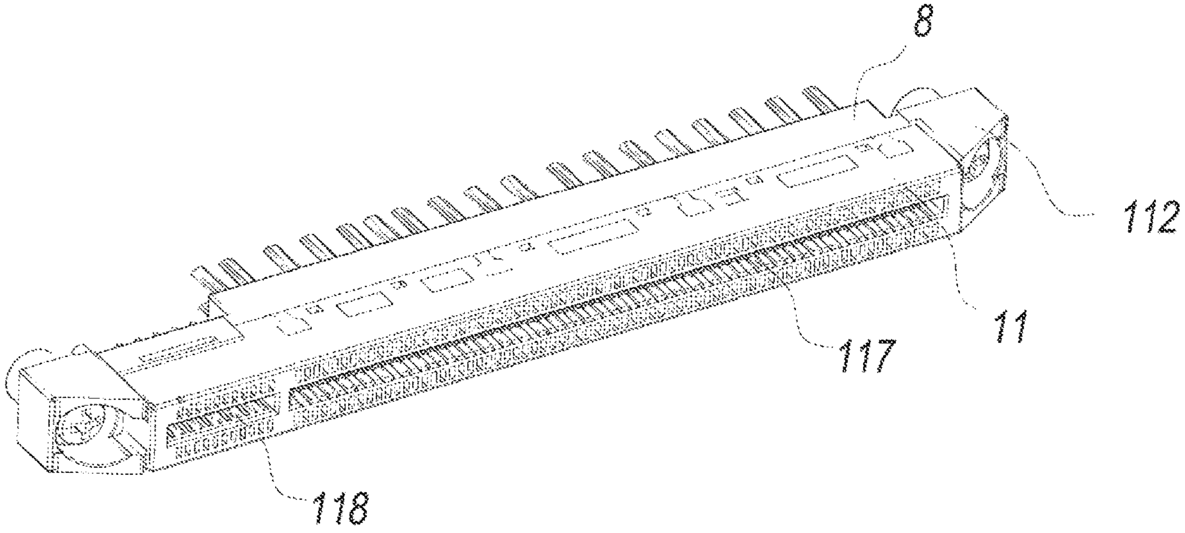
FIG. 27 is a structural diagram of a cable connector according to Embodiment 4.
Figure 28:
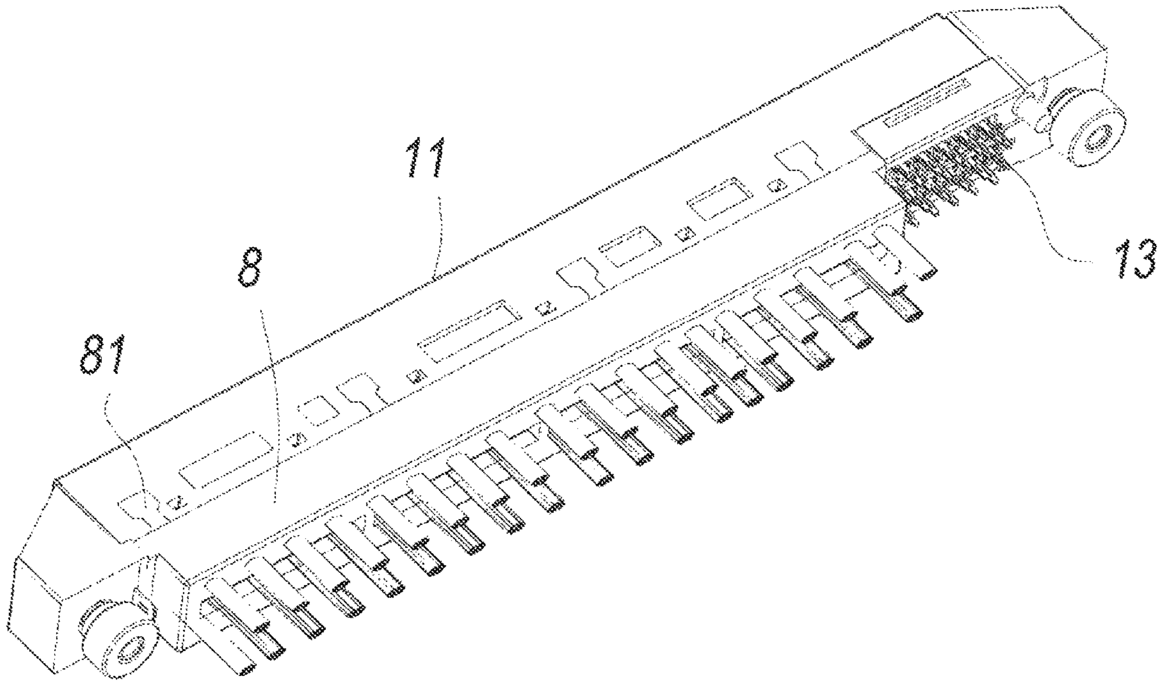
FIG. 28 is a structural diagram of the cable connector shown in FIG. 27 from another angle.

As shown in FIG. 27, in this embodiment, the cable connector includes one plastic body 11. The plastic body 11 is provided with the first socket 117 and the second socket 118. The two side ends of the plastic body 11 are respectively provided with mounting portions 112. The mounting portions 112 are fixedly connected to circuit board 2 with chip 3. A user connects the cable connector to the circuit board 2 through a connecting member. The circuit board is provided with a bolt hole, and the connecting member is a bolt. The mounting portion is embedded with a nut. The bolt is threaded through the bolt hole of the circuit board and locked with the nut. Alternatively, the connecting member is a combination of the bolt 17 and the nut 16. The mounting portion is provided with straight slot 113, and the bolt 17 is inserted into the straight slot 113 of the mounting portion and the bolt hole 27 of the circuit board. The side end is locked by the nut 16.

Figure 29:
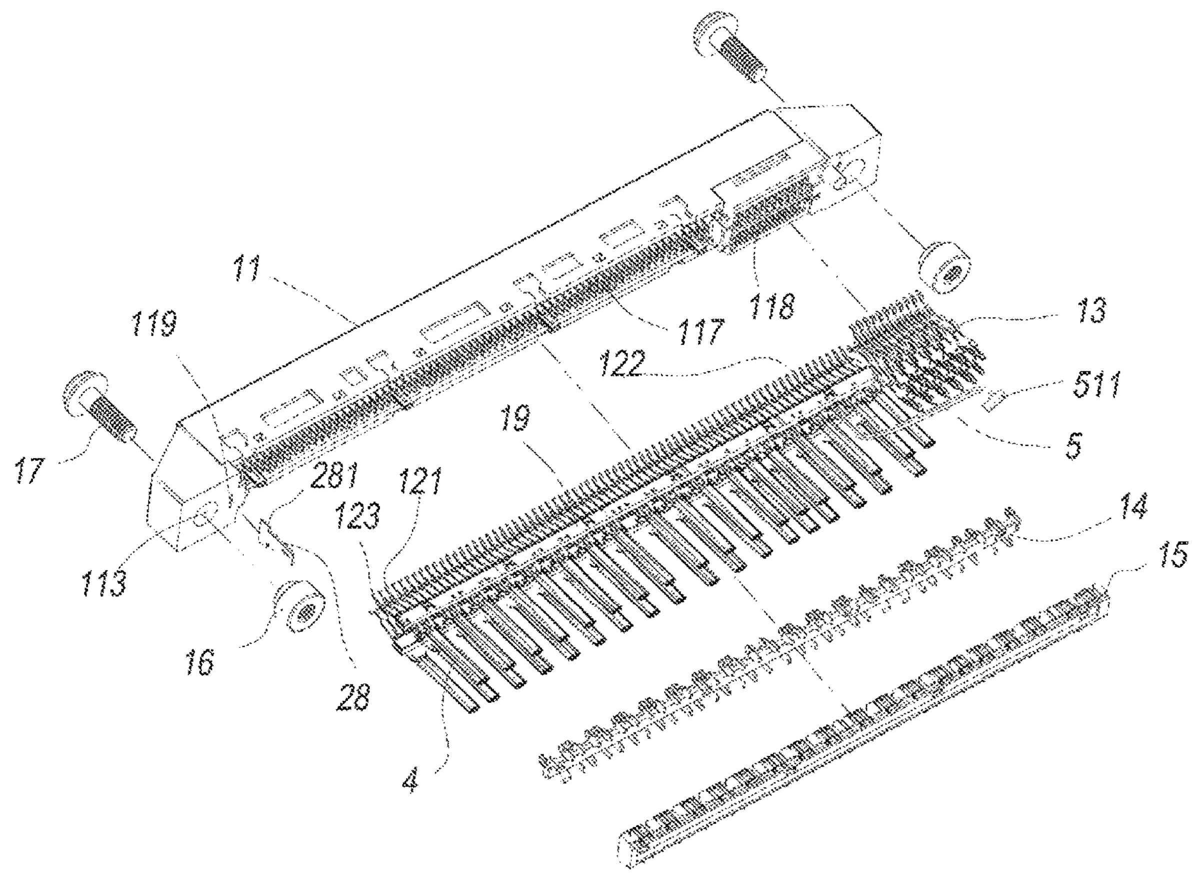
FIG. 29 is an exploded view of the cable connector shown in FIG. 28 (an outer mold is not shown)
Figure 30:
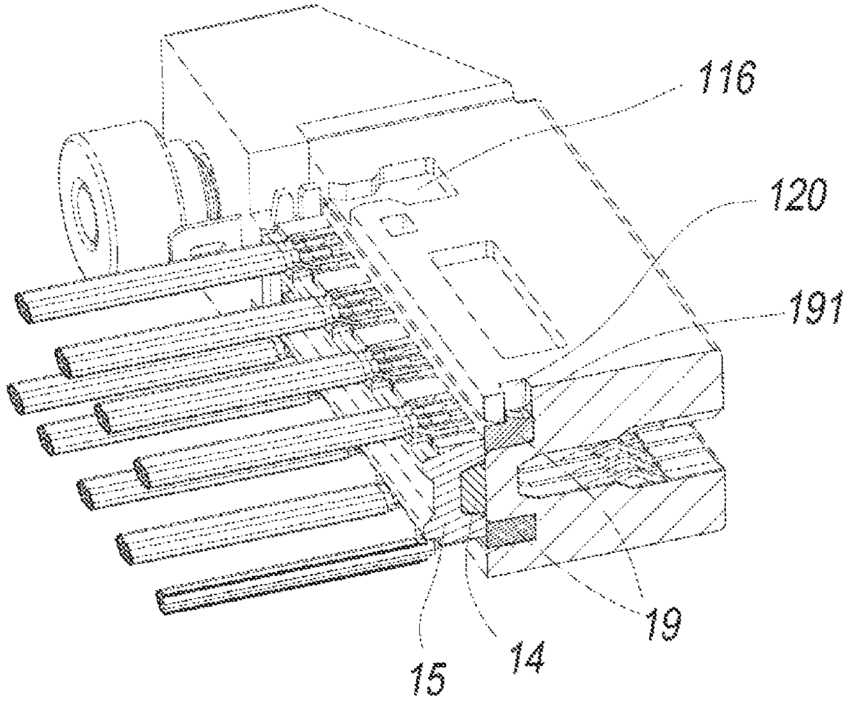
FIG. 30 is a perspective view of the cable connector according to Embodiment 4 (the outer mold is not shown)
Figure 31:
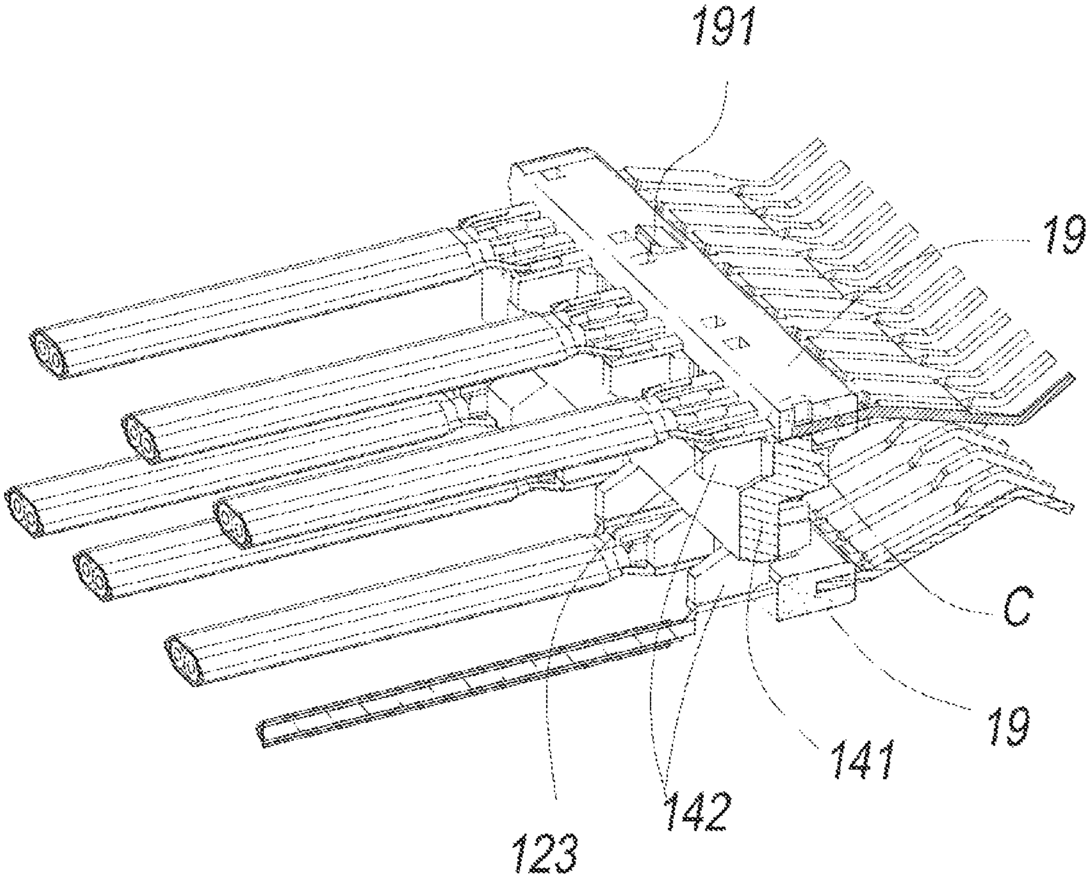
FIG. 31 is a schematic diagram of a terminal board connected to a conductive component.

As shown in FIG. 29, the first set of conductive terminals 12 is provided inside the plastic body, and the first set of conductive terminals 12 includes the first signal terminals 122, the second signal terminals 121, and the grounding terminals 123.

Figure 35:
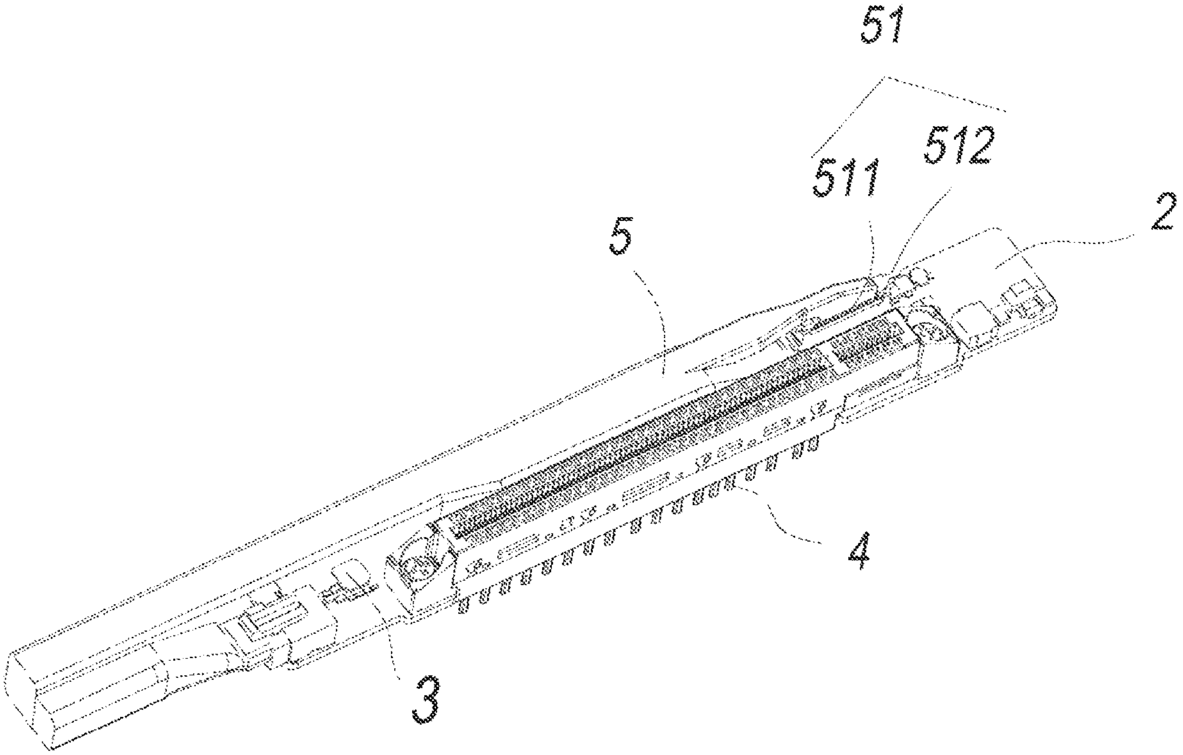
FIG. 35 is a schematic diagram showing a usage state of the cable connector, according to Embodiment 4, mounted on a circuit board.

The first signal terminal 122 includes the first docking portion 1221 and the first tail portion 1222, and the first docking portion 1221 is located in the first socket 117. The first signal cable 5 includes one end electrically connected to the first tail portion 1222 of the first signal terminal 122 and the other end connected to the circuit board 2 and conductively connected to the chip on the circuit board 2. An end of the first signal cable 5 can be directly soldered to the circuit board or electrically connected to the circuit board through the third connector 51. As shown in FIG. 35, the third connector 51 includes pin 511 and jack 512. The pin 511 is provided on an end of the first signal cable, and the jack 512 is provided on the circuit board 2. The pin 511 is inserted into the jack 512, such that the first signal cable 5 is electrically connected to the circuit board 2.

The second signal terminal 121 includes the second docking portion 1211 and the second tail portion 1212. The second docking portion 1211 is located in the first socket 117. The second tail portion 1212 is electrically connected to the second signal cable 4.

The second conductive terminal 13 includes the docking end 133 and the contact end 134. The docking end 133 is located in the second socket 118. The contact end 134 of the second conductive terminal 13 is electrically connected to the circuit board 2.

In this embodiment, the signal transmission and signal connection of the first signal terminals 122, the second signal terminals 121, and the second conductive terminal 13 are the same as those in Embodiment 1.

The cable connector further includes a terminal holding mechanism. The terminal holding mechanism can adopt the structure of Embodiment 1. In addition, this embodiment further provides another structure of the terminal holding mechanism. In this embodiment, the terminal holding mechanism includes the terminal board 19, the conductive component 14, and the insulating rear plug 15 surrounding the conductive component 14. The grounding terminals 123 are conductively connected through the conductive component 14. The terminal holding mechanism is attached to the plastic body 11 to hold the grounding terminals 123, the first signal terminals 122 and the second signal terminals 121 in the plastic body 11.

Figure 33:
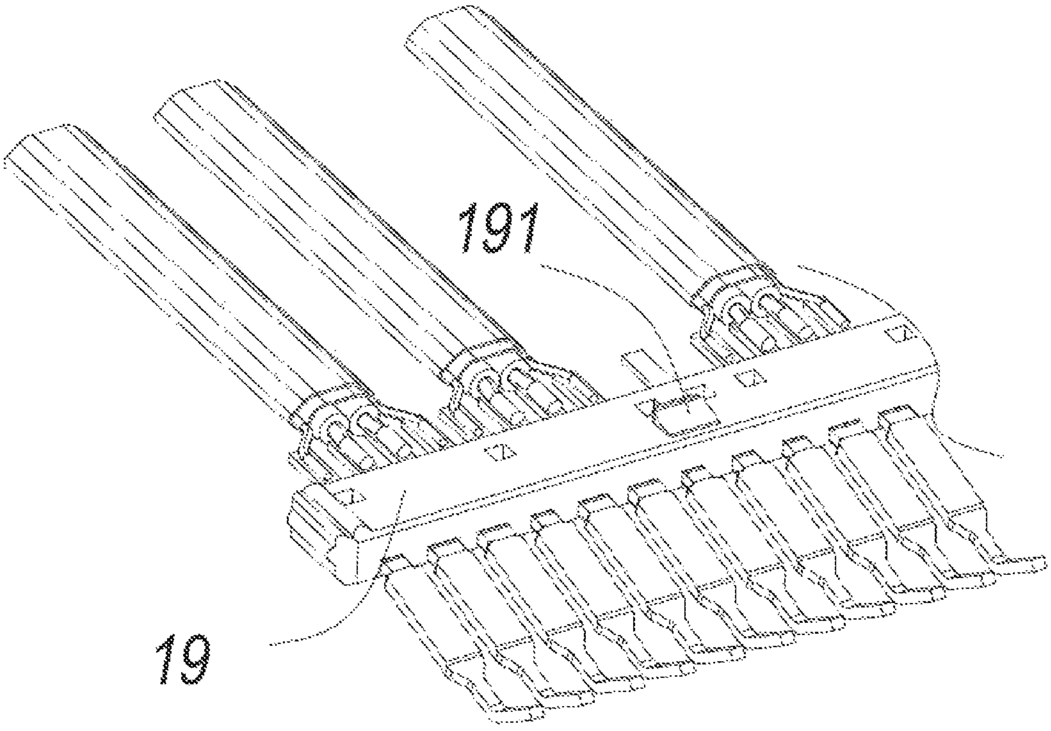
FIG. 33 is a schematic diagram of the terminal board connected to a first set of conductive terminals.

As shown in FIG. 33, the terminal board 19 is injection-molded onto the first set of conductive terminals 12. A side of terminal board 19 close to the plastic body 11 is provided with clamping protrusion 191. A corresponding position of the plastic body 11 is provided with clamping slot 120. The clamping protrusion 191 is clamped into the clamping slot 120.

Figure 34:
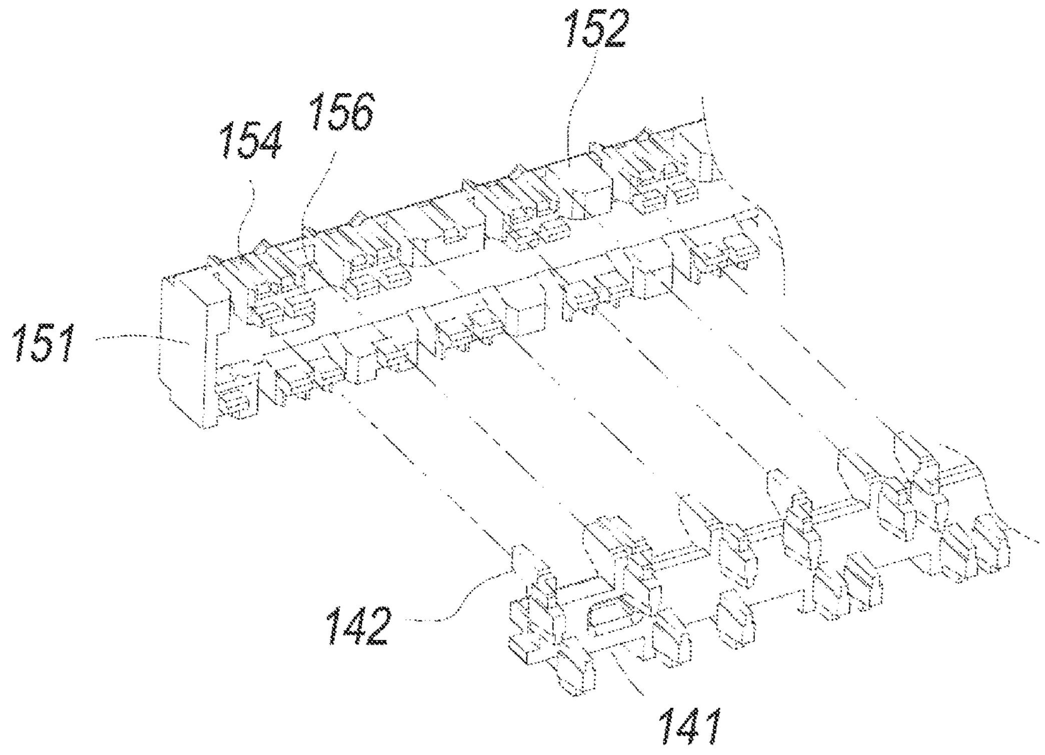
FIG. 34 is a schematic diagram of connecting the conductive component to an insulating rear plug.

As shown in FIG. 34, the conductive component 14 includes the connection body 141 and the contact arms 142 protruding from the connection body 141 and corresponding to positions of the grounding terminals 123. The grounding terminals 123 are closely matched with the contact arms 142.

Figure 32:
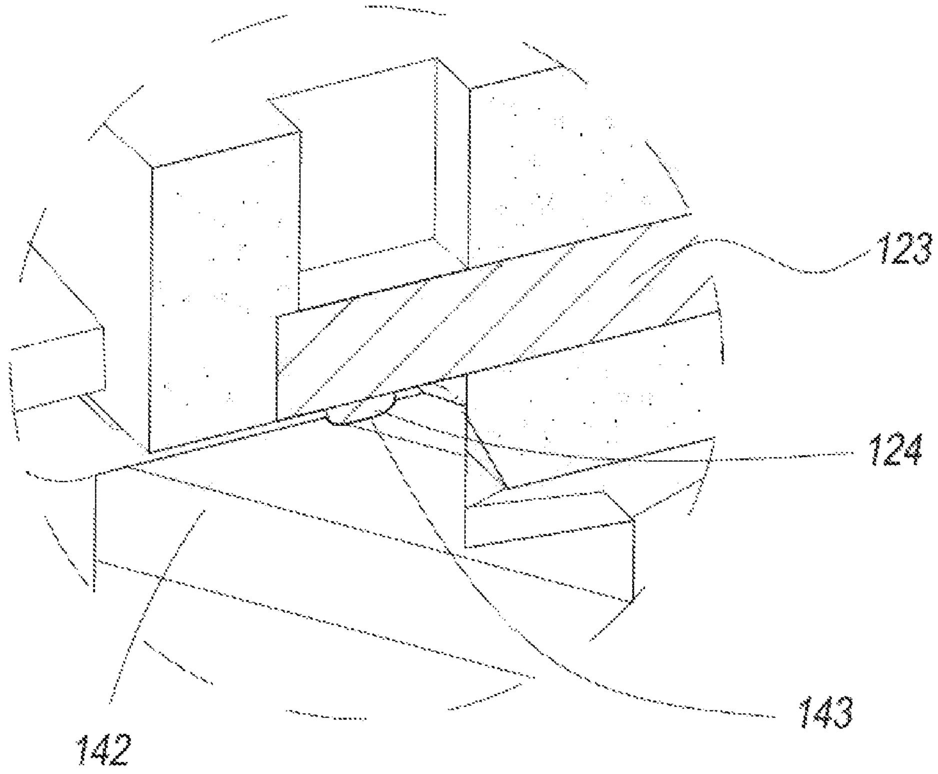
FIG. 32 is an enlarged view of C shown in FIG. 31.

In some embodiments, the contact arm 142 is provided with the dimple 143, and the grounding terminal 123 is provided with the protrusion 124. The end of the grounding terminal 123 is overlapped on the contact arm 142, and the protrusion 124 is inserted into the dimple 143 to achieve an interference fit, as shown in FIG. 32.

As shown in FIG. 34, the insulating rear plug 15 includes the base portion 151 and the partition portion 152. The partition portion 152 protrudes from the base portion 151. Mounting spaces 156 are provided between the base portion 151 and the partition portion 152 for the contact arms 142 of the conductive component 14 to be inserted. The contact arms 142 are inserted into the mounting spaces 156 to connect the conductive component 14 to the insulating rear plug 15. The partition portion 152 is provided with a plurality of stepped grooves 154. The first signal terminals 122 and the second signal terminals 121 are provided in the stepped grooves 154 and separated from each other.

In order to improve insulation performance, the cable connector further includes the insulating outer mold 8 injection-molded onto the plastic body 11. The outer mold 8 covers an electrical connection zone between the first signal terminals 122 and the first signal cables 5 and an electrical connection zone between the second signal terminals 121 and the second signal cables 4.

A plurality of grooves 116 are provided on the upper and lower sides of the plastic body 11. When injection-molded onto the plastic body 11, the outer mold 8 fills the grooves 116 to form clamping members 81. The internal width of the groove 116 is greater than the outlet width of the groove 116 to increase the holding force between the outer mold 8 and the plastic body 11.

As shown in FIG. 29, in order to facilitate the positioning of the plastic body 11, the cable connector further includes the positioning piece 28. One end of the positioning piece 28 is provided with flange 281. The clamping groove 119 is provided at the lower side of the plastic body 11. Correspondingly, the circuit board is provided with the inserting slot 29. The flange 281 of the positioning piece 28 is clamped into the clamping groove 119 of the plastic body 11. The other end of the positioning piece 28 passes through the inserting slot 29 to achieve positioning.

As shown in FIG. 35, when in use, only the mounting portions 112 of the plastic body 11 need to be locked onto the circuit board 2. The second conductive terminal 13 is connected in contact with the circuit board 2. The pin 511 of the first signal cable 5 is inserted into the jack 512 of the circuit board 2.

What is claimed is:

1. A cable connector, comprising:

a circuit board;

a plastic body, fixed on the circuit board, wherein a first socket is provided in the plastic body;

a chip, provided on the circuit board;

a first set of conductive terminals, provided in the plastic body, and comprising first signal terminals, wherein each of the first signal terminals comprises a first docking portion and a first tail portion, and the first docking portion is located in the first socket;

first signal cables, wherein each of the first signal cables comprises a first end electrically connected to the first tail portion of each of the first signal terminals and a second end connected to the circuit board and conductively connected to the chip; and a first signal transmission component, electrically connected to the circuit board and conductively connected to the chip.

2. The cable connector according to claim 1, further comprising second signal cables, wherein the first set of conductive terminals further comprises second signal terminals; each of the second signal terminals comprises a second docking portion and a second tail portion; the second docking portion is located in the first socket; and the second tail portion is electrically connected to each of the second signal cables.

3. The cable connector according to claim 2, further comprising a second conductive terminal and a second signal transmission component, wherein a side of the plastic body is provided with a second socket; the second conductive terminal comprises a docking end and a contact end; the docking end is located in the second socket; and the second signal transmission component is connected to the circuit board;

the contact end is connected to the circuit board, and the contact end is directly conductively connected to the second signal transmission component; and alternatively, the contact end is connected to the circuit board, and the contact end is conductively connected to the chip; and the chip is conductively connected to the second signal transmission component.

4. The cable connector according to claim 3, wherein the first signal transmission component is at least one of a first connector, a first signal connection cable, and a first gold finger provided on the circuit board; and the second signal transmission component is at least one of a second connector, a second signal connection cable, and a second gold finger provided on the circuit board; and an end of each of the first signal cables is directly soldered onto the circuit board; and alternatively, a third connector is provided on the circuit board, and each of the first signal cables is electrically connected to the circuit board through the third connector.

5. The cable connector according to claim 4, wherein the first signal terminals and the first signal cables are configured to transmit a sideband signal, and the second signal terminals and the second signal cables are configured to transmit a high-speed signal; and the second conductive terminal is a power terminal.

6. The cable connector according to claim 4, wherein when one plastic body is provided, the first docking portion and the second docking portion are arranged side by side and spaced apart in the first socket;

when a plurality of plastic bodies are provided, the plurality of plastic bodies are provided on a same side of the circuit board, or the plurality of plastic bodies are respectively provided on two sides of the circuit board; and the first docking portion and the second docking portion are provided in the first socket of any one or more of the plurality of plastic bodies; and at least one of the plurality of plastic bodies is provided with a second socket; the docking end of the second conductive terminal is directly provided in the second socket; and alternatively, the docking end is provided on a terminal connector, and the terminal connector is provided in the second socket.

7. The cable connector according to claim 6, further comprising a terminal holding mechanism and grounding terminals, wherein the grounding terminals are provided between the first signal terminals and the second signal terminals of the first set of conductive terminals;

the terminal holding mechanism comprises a conductive component and an insulating rear plug surrounding the conductive component; the grounding terminals are conductively connected through the conductive component; and the terminal holding mechanism is attached to the plastic body to hold the grounding terminals, the first signal terminals and the second signal terminals in the plastic body; and the conductive component comprises a connection body and contact arms, wherein the contact arms protrude from the connection body and correspond to positions of the grounding terminals; each of the contact arms is provided with a dimple, and each of the grounding terminals is provided with a protrusion; an end of each of the grounding terminals is overlapped on each of the contact arms; and the protrusion is inserted into the dimple to achieve an interference fit.

8. The cable connector according to claim 7, wherein the insulating rear plug comprises a base portion, a partition portion, and support arms; the partition portion protrudes from the base portion; the partition portion is provided with a plurality of stepped grooves; the first signal terminals, the second signal terminals, and the grounding terminals are provided in the plurality of stepped grooves and separated from each other; the support arms protrude from the partition portion; and the second signal terminals and the first signal terminals are overlapped on the support arms; and the partition portion is further provided with an avoidance groove; the avoidance groove is correspondingly provided below a soldering position of the first signal terminals, the second signal terminals and the grounding terminals; and the avoidance groove has a depth of 0.1 mm-3.0 mm and a width of 0.1 mm-3.0 mm.

9. The cable connector according to claim 8, further comprising an insulating outer mold injection-molded onto the plastic body, wherein the insulating outer mold covers an electrical connection zone between the first signal terminals and the first signal cables and an electrical connection zone between the second signal terminals and the second signal cables; and a plurality of grooves are provided on upper and lower sides of the plastic body; when the insulating outer mold is injection-molded onto the plastic body, the insulating outer mold fills the plurality of grooves to form clamping members; and an internal width of each of the plurality of grooves is greater than an outlet width of each of the plurality of grooves to increase a holding force between the insulating outer mold and the plastic body.

10. The cable connector according to claim 5, wherein the power terminal comprises a plurality of press-fit terminals; the plastic body is provided with a plurality of positioning posts on two sides of the plurality of press-fit terminals; an end of each of the plurality of positioning posts protrudes from each of the plurality of press-fit terminals; the circuit board is provided with contact holes and positioning slots; the plurality of positioning posts are inserted into the positioning slots; and the plurality of press-fit terminals are inserted into the contact holes to achieve an electrical connection to the circuit board.

11. The cable connector according to claim 1, further comprising a positioning piece, wherein a first end of the positioning piece is provided with a flange; an end of the plastic body is provided with a clamping groove; the circuit board is provided with an inserting slot; the flange of the positioning piece is clamped into the clamping groove of the plastic body; and a second end of the positioning piece passes through the inserting slot to position or fix an insulating body with the circuit board.

12. A cable connector, comprising:

a plastic body, wherein a first socket is provided in the plastic body, a mounting portion is provided on the plastic body, and the mounting portion is fixedly connected to a circuit board with a chip;

a first set of conductive terminals, provided in the plastic body, and comprising first signal terminals, wherein each of the first signal terminals comprises a first docking portion and a first tail portion, and the first docking portion is located in the first socket; and first signal cables, wherein each of the first signal cables comprises a first end electrically connected to the first tail portion of each of the first signal terminals and a second end connected to the circuit board and conductively connected to the chip on the circuit board.

13. The cable connector according to claim 12, wherein an end of each of the first signal cables is provided with a pin, and the pin is inserted into a jack of the circuit board.

14. The cable connector according to claim 13, further comprising:

a connecting member, wherein the connecting member is configured to fixedly connect the circuit board to the mounting portion of the plastic body;

second signal cables, wherein the first set of conductive terminals further comprises second signal terminals held in the first socket, and the second signal cables are electrically connected to the second signal terminals; and a second conductive terminal, wherein a side of the plastic body is provided with a second socket; the second conductive terminal comprises a docking end and a contact end; the docking end is located in the second socket; and the contact end is electrically connected to the circuit board.

15. The cable connector according to claim 14, wherein the first signal terminals and the first signal cables are configured to transmit a sideband signal, and the second signal terminals and the second signal cables are configured to transmit a high-speed signal; and the second conductive terminal is a power terminal.

16. The cable connector according to claim 14, further comprising a terminal holding mechanism and grounding terminals, wherein the grounding terminals are provided between the first signal terminals and the second signal terminals of the first set of conductive terminals; and the terminal holding mechanism comprises a conductive component and an insulating rear plug surrounding the conductive component; the grounding terminals are conductively connected through the conductive component; and the terminal holding mechanism is attached to the plastic body to hold the grounding terminals, the first signal terminals and the second signal terminals in the plastic body.

17. The cable connector according to claim 16, wherein the insulating rear plug comprises a base portion and a partition portion; the partition portion protrudes from the base portion; mounting spaces are provided between the base portion and the partition portion for contact arms of the conductive component to be inserted; the contact arms are inserted into the mounting spaces to connect the conductive component to the insulating rear plug; the partition portion is provided with a plurality of stepped grooves; and the first signal terminals and the second signal terminals are provided in the plurality of stepped grooves and separated from each other.

18. The cable connector according to claim 17, further comprising an insulating outer mold injection-molded onto the plastic body, wherein the insulating outer mold covers an electrical connection zone between the first signal terminals and the first signal cables and an electrical connection zone between the second signal terminals and the second signal cables; and a plurality of grooves are provided on upper and lower sides of the plastic body; when the insulating outer mold is injection-molded onto the plastic body, the insulating outer mold fills the plurality of grooves to form clamping members; and an internal width of each of the plurality of grooves is greater than an outlet width of each of the plurality of grooves to increase a holding force between the insulating outer mold and the plastic body.

19. The cable connector according to claim 18, further comprising a positioning piece, wherein a first end of the positioning piece is provided with a flange; an end of the plastic body is provided with a clamping groove; the flange of the positioning piece is clamped into the clamping groove of the plastic body; and a second end of the positioning piece protrudes from the end of the plastic body, and the second end of the positioning piece is positioned or fixed with the circuit board.

* * * * *